US012775098B2

(12) United States Patent
Zhang et al.

(10) Patent No.: US 12,775,098 B2
(45) Date of Patent: Oct. 27, 2026

(54) SENSOR CONFIGURATION FOR AUTONOMOUS VEHICLES

(71) Applicant: TUSIMPLE, INC., San Diego, CA (US)

(72) Inventors: Chiyu Zhang, Tucson, AZ (US); Jianqiu Cao, Tucson, AZ (US); Pengji Duan, Tucson, AZ (US); Yishi Liu, Tucson, AZ (US); Joshua Miguel Rodriguez, Tucson, AZ (US); Tristan Nguyen, San Diego, CA (US); Xiaoling Han, San Diego, CA (US)

(73) Assignee: CreateAI, Inc., San Diego, CA (US)

( * ) Notice: Subject to any disclaimer, the term of this patent is extended or adjusted under 35 U.S.C. 154(b) by 214 days.

(21) Appl. No.: 18/456,393

(22) Filed: Aug. 25, 2023

(65) Prior Publication Data

US 2024/0077619 A1 Mar. 7, 2024

Related U.S. Application Data

(60) Provisional application No. 63/374,527, filed on Sep. 2, 2022.

(51) Int. Cl.
*G01S 17/931* (2020.01)
*B60W 60/00* (2020.01)

(52) U.S. Cl.
CPC ......... *G01S 17/931* (2020.01); *B60W 60/001* (2020.02); *B60W 2420/408* (2024.01); *B60W 2422/95* (2013.01)

(58) Field of Classification Search
CPC ........... B60W 60/001; B60W 2422/95; B60W 2420/408; G01S 17/931
See application file for complete search history.

(56) References Cited

U.S. PATENT DOCUMENTS

| | | | | |
|---|---|---|---|---|
| 10,877,476 | B2 * | 12/2020 | Liu | G06F 11/3698 |
| 11,847,869 | B1 * | 12/2023 | Andrzejewski | G06F 16/2477 |
| 11,891,075 | B2 * | 2/2024 | Rocha | B60W 60/0018 |
| 2018/0158315 | A1 * | 6/2018 | Sloo | H04L 67/54 |
| 2018/0197417 | A1 | 7/2018 | Burtch et al. | |
| 2018/0372875 | A1 * | 12/2018 | Juelsgaard | G01S 17/931 |
| 2020/0064483 | A1 * | 2/2020 | Li | G01S 13/867 |
| 2020/0142073 | A1 | 5/2020 | Gassend et al. | |
| 2021/0191399 | A1 * | 6/2021 | Verghese | H04N 7/18 |

(Continued)

*Primary Examiner* — Andrea C Leggett
(74) *Attorney, Agent, or Firm* — Ashurst Perkins Coie US LLP

(57) ABSTRACT

An example sensor system for use with a vehicle includes a first group of sensing devices that are associated with an essential level of autonomous operation of the vehicle. The first group of sensing devices are configured and intended for continuous use while the vehicle is being autonomously operated. The sensor system further includes a second group of sensing devices that are associated with a non-essential level of autonomous operation of the vehicle. For example, the second group of sensing devices are configured to be redundant to and/or to enhance the performance of the first group of sensing devices. The second group operates in response to certain conditions being determined during autonomous operation of the vehicle. The sensor system further includes a plurality of assemblies attached to the vehicle. Each assembly includes two or more sensing devices from the first group and/or the second group.

20 Claims, 23 Drawing Sheets

(56) References Cited

U.S. PATENT DOCUMENTS

| | | | | |
|---|---|---|---|---|
| 2021/0237667 | A1* | 8/2021 | Zheng | B60W 20/50 |
| 2022/0126864 | A1* | 4/2022 | Moustafa | B60W 50/14 |
| 2022/0210362 | A1 | 6/2022 | Dharia et al. | |
| 2023/0119762 | A1* | 4/2023 | Geng | G01S 17/42<br>701/25 |
| 2023/0192145 | A1* | 6/2023 | Das | G01S 13/865 |

* cited by examiner

SENSOR CONFIGURATION FOR AUTONOMOUS VEHICLES

CROSS-REFERENCE TO RELATED APPLICATIONS

This document claims priority to and the benefit of U.S. Provisional Application No. 63/374,527, filed on Sep. 2, 2022. The aforementioned application of which is incorporated herein by reference in its entirety.

TECHNICAL FIELD

This document relates to sensor systems and techniques for semi-autonomous and autonomous control of vehicles. This document claims priority to and the benefit of U.S. Provisional Application No. 63/368,720, filed on Jul. 18, 2022. The aforementioned application of which is incorporated herein by reference in its entirety.

BACKGROUND

Autonomous vehicle navigation is a technology that can control the autonomous vehicle to safely navigate towards a destination. A prerequisite for safe navigation and control of the autonomous vehicle includes an ability to sense the position and movement of vehicles and other objects around an autonomous vehicle. Thus, to safely operate an autonomous vehicle, a need exists for the autonomous vehicle to obtain data that can be accurately and reliably used to orient the autonomous vehicle in its environment.

SUMMARY

This patent document discloses example embodiments for sensor systems and related techniques, apparatuses, and computer program products for collecting accurate and reliable data on an environment surrounding a vehicle. In example embodiments, a sensor system includes multiple sensing devices that are located inside of assemblies attached to the vehicle. Example embodiments provide layouts and configurations of the multiple sensing devices to provide full sensor coverage (e.g., 360 degrees) around the vehicle. The sensor system includes different types of sensing devices, including cameras of different ranges, solid-state light detection and ranging (LiDAR) devices of different ranges, radar devices, global navigation satellite system (GNSS) devices, and others. Different sensing devices of the sensor system are associated with different levels of autonomous operation to provide redundancy and safety.

Accordingly, disclosed sensor systems and techniques described herein are used with an autonomous vehicle (e.g., for autonomous operation of a vehicle) to detect objects located outside of the autonomous vehicle, to track objects as the objects and/or the autonomous vehicle move relative to each other, to estimate speeds of objects moving outside of the autonomous vehicle, to estimate distances between the autonomous vehicle and objects, and/or to provide continued operation in events of failure. Embodiments disclosed herein enable lane marking detection and traffic sign/light detection for autonomous operation of a vehicle. Embodiments disclosed herein enable modularity of a sensor system and portions thereof, resulting in improvements for offboard calibration, manufacturing, installation, and repair.

In one exemplary aspect of the present disclosure, a system for use on an autonomous vehicle is disclosed. The system includes a first group of sensing devices that are associated with an essential level of autonomous operation of the autonomous vehicle. The system includes a second group of sensing devices that are associated with a non-essential level of autonomous operation of the autonomous vehicle. The system includes a plurality of assemblies attached to the autonomous vehicle. Each assembly includes two or more sensing devices from the first group and/or the second group. For example, a particular assembly includes at least a first sensing device from the first group and a second sensing device from the second group, and the second sensing device is configured to be redundant with the first sensing device.

In another exemplary aspect, an autonomous vehicle is disclosed. The autonomous vehicle includes a plurality of assemblies that are attached to the autonomous vehicle. The autonomous vehicle includes a plurality of LiDAR devices that are each located inside of an assembly of the plurality of assemblies. Each LiDAR device is oriented to collect sensor data for a different portion of an environment surrounding the autonomous vehicle. The plurality of LiDAR devices includes a first subset of LiDAR devices associated with a first priority level and a second subset of LiDAR devices associated with a second priority level. In some examples, the first priority level corresponds with an essential level of autonomous operation of the autonomous vehicle, and the second priority level corresponds with a fail-operational or a non-essential level of autonomous operation of the autonomous vehicle.

In yet another exemplary aspect, a method for autonomous operation of a vehicle is disclosed. The method includes detecting a failure condition for at least one sensing device of a first group of sensing devices installed on the vehicle. The method includes causing a second group of sensing devices to transition to an operational state in which the second group of sensing devices are configured to collect sensor data redundant with sensor data that the at least one sensing device of the first group of sensing devices is configured to collect. The method includes determining a driving-related operation for the vehicle according to the sensor data that is collected by the second group of sensing devices. The method includes transmitting an instruction related to the driving-related operation for the vehicle to one or more subsystems of the vehicle to cause the vehicle to perform the driving-related operation.

In yet another exemplary aspect, a non-transitory computer readable storage medium is disclosed. The non-transitory computer readable storage medium stores instructions that when executed by a processor, cause the processor to perform methods described herein.

In yet another exemplary aspect, a system or apparatus is disclosed. The system or apparatus includes a processor configured to cause the system or apparatus to implement method described herein.

The above and other aspects and their implementations are described in greater detail in the drawings, the descriptions, and the claims.

DETAILED DESCRIPTION

The transportation industry has been undergoing considerable changes in the way technology is used to control the operation of a vehicle. A vehicle is provided with various sensors or sensing devices. With the significant advancement of sensor and communication technology and the reliable application of obstacle detection techniques and algorithms, automated driving is becoming a pivotal technology that can revolutionize the future of transportation and mobility. Sensors are fundamental to the perception of vehicle surroundings in an automated driving system, and the use and performance of multiple integrated sensors can directly determine the safety and feasibility of automated driving vehicles.

Technical solutions related to the use of sensors with a vehicle to enable autonomous operation of the vehicle are disclosed herein. According to example embodiments, sensors or sensing devices are configured and used with a vehicle to provide awareness of the surrounding environment of the vehicle and perform specific tasks such as object detection, roadway mapping and lane marking detection, ranging, and/or the like. Example embodiments disclosed herein provide further advantages related to modularity of sensor system and improved installation of sensing devices on a vehicle. Further, in example embodiments, redundant and layered operation of sensing devices of a vehicle is provided for operational improvements and efficiency.

I. Exemplary Vehicle Ecosystem and Subsystems

Figure 1:
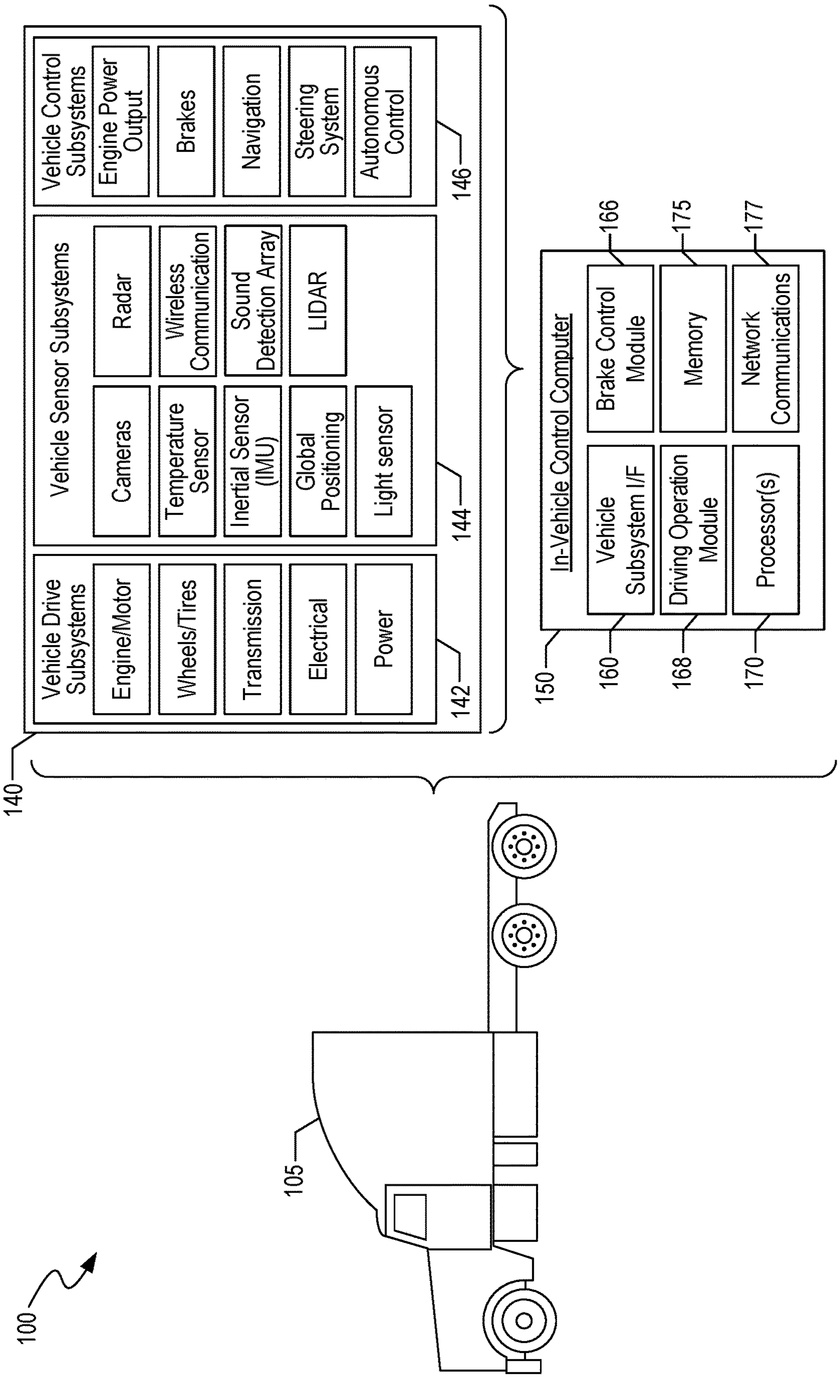
FIG. 1 shows a block diagram of an example vehicle ecosystem in which an exemplary sensor system for an autonomous vehicle can be implemented.

FIG. 1 shows a block diagram of an example vehicle ecosystem 100 in which exemplary sensor systems for an autonomous vehicle 105 (e.g., a car, a truck, a semi-trailer truck) can be implemented. The vehicle ecosystem 100 includes several systems and devices that can generate and/or deliver one or more sources of information/data and related services to the in-vehicle control computer 150 that may be located in an autonomous vehicle 105. The in-vehicle control computer 150 can be in data communication with a plurality of vehicle subsystems 140, all of which can be resident in an autonomous vehicle 105. A vehicle subsystem interface 160 is provided to facilitate data communication between the in-vehicle control computer 150 and the plurality of vehicle subsystems 140. The vehicle subsystem interface can include a wireless transceiver, a Controller Area Network (CAN) transceiver, an Ethernet transceiver, serial ports, gigabit multimedia serial link 2 (GMSL2) ports, local interconnect network (LIN) ports, or any combination thereof.

The autonomous vehicle 105 may include various vehicle subsystems that support the operation of autonomous vehicle 105. The vehicle subsystems may include a vehicle drive subsystem 142, a vehicle sensor subsystem 144, a vehicle control subsystem 146, and/or a vehicle power subsystem 148. The vehicle drive subsystem 142 may include components operable to provide powered motion for the autonomous vehicle 105. In an example embodiment, the vehicle drive subsystem 142 may include an engine or motor, wheels/tires, a transmission, an electrical subsystem, and a power source (e.g., battery and/or alternator).

The vehicle sensor subsystem 144 includes a number of sensors or sensing devices configured to sense information about an environment or condition of the autonomous vehicle 105. For example, the vehicle sensor subsystem 144 includes inertial measurement units (IMUs), GNSS or Global Positioning System (GPS) transceivers, radar units or devices, LiDAR devices and/or laser range finders, and cameras or image capture devices. The vehicle sensor subsystem 144 may also include sensors configured to monitor internal systems of the autonomous vehicle 105 (e.g., an 02 monitor, a fuel gauge, an engine oil temperature).

The LiDAR units or laser range finders of the vehicle sensor subsystem 144 may be any sensor configured to sense objects in the environment in which the autonomous vehicle 105 is located using lasers. In some embodiments, the vehicle sensor subsystem 144 includes a plurality of LiDAR devices that are associated with different ranges. For example, the vehicle sensor subsystem 144 includes one or more LiDAR devices configured for long-range sensing (e.g., up to 400 meters, up to 500 meters, up to 600 meters), one or more LiDAR devices for medium-range sensing (e.g., up to 150 meters, up to 200 meters, up to 300 meters), and one or more LiDAR devices configured for short-range sensing (e.g., up to 20 meters, up to 30 meters, up to 50 meters, up to 100 meters).

With different ranges, the LiDAR devices have different fields-of-view. For example, the long-range LiDAR devices have a horizontal field-of-view of 38 to 42 degrees, 35 to 45 degrees, or 30 degrees to 50 degrees. For example, the medium-range LiDAR devices have a horizontal field-of-view of 100 to 150 degrees, 110 degrees to 140 degrees, or 115 degrees to 125 degrees. For example, the short-range LiDAR devices have a horizontal field-of-view of 150 degrees to 200 degrees, 170 degrees to 190 degrees, or 175 degrees to 185 degrees.

In some embodiments, the LiDAR devices are the vehicle sensor subsystem 144 are solid-state non-spinning LiDAR devices, which improve reliability and lower resource (e.g., power) costs.

In some embodiments, the vehicle sensor subsystem 144 includes a plurality of cameras that are associated with different ranges. For example, the vehicle sensor subsystem 144 includes cameras configured for long-range imaging (e.g., 20 meters to 1200 meters, 30 meters to 1000 meters, 50 meters to 800 meters), cameras configured for medium-range imaging (e.g., up to 750 meters, 10 meters to 500 meters, 25 meters to 300 meters), and cameras configured for short-range imaging (e.g., up to 100 meters, up to 150 meters, up to 200 meters). Cameras configured for different ranges have different fields-of-view. For example, long-range cameras have a relatively narrow field-of-view (e.g., 15 degrees, 18 degrees, 23 degrees horizontally), medium-range cameras have a relatively medium field-of-view (e.g., 27 degrees, 30 degrees, 40 degrees horizontally), and short-range cameras have a relatively wider field-of-view (e.g., 60 degrees, 70 degrees, 80 degrees horizontally). The cameras may be still image cameras or motion video cameras.

In some embodiments, the vehicle sensor subsystem 144 includes cameras of different types. For example, the vehicle sensor subsystem 144 includes red-green-blue (RGB) cameras configured to capture image data for a visual spectrum, infra-red (IR) and long-wave infra-red (LWIR) cameras configured to capture image data for IR and LWIR spectra, wide-angle or fisheye cameras, and the like. In some examples, the wide-angle cameras have wider fields-of-view (e.g., 180 degrees, 200 degrees, 210 degrees horizontally), and the infrared cameras have relatively narrow fields-of-view (e.g., 20 degrees, 24, degrees, 30 degrees horizontally).

IMUs of the vehicle sensor subsystem 144 include any combination of sensors (e.g., accelerometers and gyroscopes) configured to sense position and orientation changes of the autonomous vehicle 105 based on inertial acceleration. GNSS/GPS transceivers are devices configured to estimate a geographic location of the autonomous vehicle 105. For this purpose, a GNSS/GPSS device includes a receiver/transmitter operable to provide information regarding the position of the autonomous vehicle 105 with respect to the Earth. In some embodiments, the vehicle sensor subsystem 144 includes one or more units that each include an IMU and a GNSS transceiver or device. For example, the vehicle sensor subsystem 144 includes GNSS/IMU integrated units. An integrated GNSS/IMU unit or device includes an IMU, up to two antennas configured to receive GNSS satellite signals from various GNSS constellations (e.g., global positioning system or GPS, GLONASS, GALILEO, BDS), and a processing unit configured to provide information based on the received satellite signals and/or based on information obtained via the IMU. For example, the processing unit provides information including satellite time, decoded satellite signals, estimations of a vehicle's geographic location, altitude angles, velocity, heading, acceleration, and/or the like.

Radar units of the vehicle sensor subsystem 144 represent devices that utilize radio signals to sense objects within the local environment of the autonomous vehicle 105. In some embodiments, in addition to sensing the objects, radar units are additionally configured to sense the speed and the heading of the objects proximate to the autonomous vehicle 105. For example, with a radar unit, a speed of a detected object relative to the autonomous vehicle 105 is determined using Doppler shift techniques. In some examples, data collected by the radar units is used with post-processing algorithms to determine or estimate headings of detected objects.

The cameras, the LiDAR units, or other external-facing sensors (e.g., sensors configured to sense the external environment of the vehicle) of the vehicle sensor subsystem 144 may be located and oriented along the autonomous vehicle as described herein and below in relation to FIGS. 2-18. In some embodiments, the external-facing sensing devices, including the cameras and the LiDAR units, are located along the autonomous vehicle inside assemblies. More than one sensing device may be located inside of an assembly. The assemblies enable easier installation (and removal) of groups of sensing devices on the vehicle, easier and improved accuracy with calibration between sensing devices located inside the same assembly, and improved sensor fusion for data collected by sensing devices located inside the same assembly.

In some embodiments, the vehicle sensor subsystem 144 may be communicably coupled with the in-vehicle control computer 150 such that data collected by various sensors of the vehicle sensor subsystem 144 (e.g., cameras, LiDAR units) may be provided to the in-vehicle control computer 150. For example, the vehicle sensor subsystem 144 may include one or more central unit to which the sensors are coupled, and the central unit may be configured to communicate with the in-vehicle control computer 150 via wired or wireless communication. The central units may include multiple ports and serializer/deserializer units to which multiple sensors may be connected.

The sensing devices of the vehicle sensor subsystem 144 are configured to provide redundancy in sensing capability and operation. In a first aspect of redundancy provided in the vehicle sensor subsystem 144, a sensing device has a field-of-view overlapping with that of a second sensing device. The second sensing device is the same type as the sensing device in some examples; for example, the sensing devices are both cameras, both LiDAR devices, both radar units, and/or the like With this component redundancy, sensing operation is enhanced. In particular, if failure of one of the pair of redundant and overlapping sensing devices occurs, the other one of the pair can be relied upon so that overall sensing operation and capability is not compromised by the failure of the single sensing device. Examples of sensing devices configured with component redundancy are described in additional detail later in this document.

In a second aspect of redundancy provided in the vehicle sensor subsystem 144, different types of sensing devices are oriented in a same direction and support respective sensing capabilities of one another. In particular, certain sensing devices are limited in sensing capability depending on environment conditions; for example, camera sensing capability can suffer at nighttime or dark environments, while LiDAR sensing capability can suffer in heavy fog conditions. Accordingly, for a first sensing device with limited sensing in a given environmental condition, a second sensing device whose sensing is not as limited in the given environmental condition is configured to be redundant with the first sensing device (e.g., having overlapped FOVs). For example, an IR camera has an FOV overlapping with a FOV of a RGB camera to support the sensing capability of the RGN camera in nighttime conditions. As another example, a radar unit is redundant with a LiDAR device to support the LiDAR device in heavy fog conditions. Thus, in some embodiments, modality redundancy is provided with different types of sensing devices.

In some embodiments, sensors configured to be redundant with each other (e.g., two cameras with overlapped FOVs) are connected to the central unit and/or to the in-vehicle control computer via different ports or interfaces. In some embodiments, redundant sensors are coupled with different central units or controllers. For example, sensing devices associated with an essential level of autonomous operation are coupled with a first central unit or controller, while other sensing devices associated with a fail-operational or a non-essential level of autonomous operation are coupled with a second central unit or controller.

The vehicle control subsystem 146 may be configured to control operation of the autonomous vehicle 105 and its components. Accordingly, the vehicle control subsystem 146 may include various elements such as a throttle, a brake unit, a navigation unit, and/or a steering system.

The throttle may be configured to control, for instance, the operating speed of the engine and, in turn, control the speed of the autonomous vehicle 105. The brake unit can include any combination of mechanisms configured to decelerate the autonomous vehicle 105. The brake unit can use friction to slow the wheels in a standard manner. The navigation unit may be any system configured to determine a driving path or route for the autonomous vehicle 105. The navigation unit may additionally be configured to update the driving path dynamically while the autonomous vehicle 105 is in operation. In some embodiments, the navigation unit may be configured to incorporate data from the GNSS/GPS transceiver and one or more predetermined maps so as to determine the driving path for the autonomous vehicle 105.

The vehicle control subsystem 146 may be configured to control operation of power distribution units located in the autonomous vehicle 105. The power distribution units have an input that is directly or indirectly electrically connected to the power source of the autonomous vehicle 105 (e.g., alternator). Each power distribution unit can have one or more electrical receptacles or one or more electrical connectors to provide power to one or more devices of the autonomous vehicle 105. For example, various sensors of the vehicle sensor subsystem 144 such as cameras and LiDAR units may receive power from one or more power distribution units. The vehicle control subsystem 146 can also include power controller units, where each power controller unit can communicate with a power distribution unit and provide information about the power distribution unit to the in-vehicle control computer 150, for example.

Many or all of the functions of the autonomous vehicle 105 can be controlled by the in-vehicle control computer 150. The in-vehicle control computer 150 may include at least one data processor 170 (which can include at least one microprocessor) that executes processing instructions stored in a non-transitory computer readable medium, such as the data storage device 175 or memory. The in-vehicle control computer 150 may also represent a plurality of computing devices that may serve to control individual components or subsystems of the autonomous vehicle 105 in a distributed fashion.

In some embodiments, the data storage device 175 may store processing instructions (e.g., program logic) executable by the data processor 170 to perform various methods and/or functions of the autonomous vehicle 105, including those described in this patent document. For instance, the data processor 170 executes operations for processing image data collected by sensing devices (e.g., blur and/or distortion removal, image filtering, image correlation and alignment), detecting objects captured in sensor data collected by the sensing devices (e.g., using computer vision and/or machine learning techniques), accessing sensing device metadata (e.g., optical characteristics of a camera), performing distance estimation for detected objects, or the like. As another example, the data processor 170 executes operations for detecting failure conditions of sensing devices, and toggling on/off groups of sensing devices that are redundant with other groups of sensing devices.

The data storage device 175 may contain additional instructions as well, including instructions to control, receive data from, interact with, or transmit data to one or more of the vehicle drive subsystem 142, the vehicle sensor subsystem 144, the vehicle control subsystem 146, and the vehicle power subsystem 148. In some embodiment, additional components or devices can be added to the various subsystems or one or more components or devices (e.g., temperature sensor shown in FIG. 1) can be removed without affecting various embodiments described in this patent document. The in-vehicle control computer 150 can be configured to include a data processor 170 and a data storage device 175.

The in-vehicle control computer 150 may control the function of the autonomous vehicle 105 based on inputs received from various vehicle subsystems (e.g., the vehicle drive subsystem 142, the vehicle sensor subsystem 144, the vehicle control subsystem 146, and the vehicle power subsystem 148). For example, the in-vehicle control computer 150 may use input from the vehicle control subsystem 146 in order to control the steering system to avoid a high-speed vehicle detected in image data collected by overlapped cameras of the vehicle sensor subsystem 144, move in a controlled manner, or follow a path or trajectory. In an example embodiment, the in-vehicle control computer 150 can be operable to provide control over many aspects of the autonomous vehicle 105 and its subsystems. For example, the in-vehicle control computer 150 may transmit instructions or commands to cameras of the vehicle sensor subsystem 144 to collect image data at a specified time, to synchronize image collection rate or frame rate with other cameras or sensors, or the like. Thus, the in-vehicle control computer 150 and other devices, including cameras and sensors, may operate at a universal frequency, in some embodiments.

In some embodiments, the in-vehicle control computer 150 detects failure conditions of a sensing device installed on the vehicle and can cause one or more other sensing devices configured to be redundant with the sensing device to transition to an operational state. The in-vehicle control computer 150 determines driving-related operations for the vehicle according to sensor data collected by the one or more sensing devices that are transitioned to an operational state, and the in-vehicle control computer 150 transmits instructions to various subsystems (e.g., the vehicle drive subsystems 142, the vehicle control subsystems 146) to cause the vehicle to perform the driving-related operations.

Figure 2:
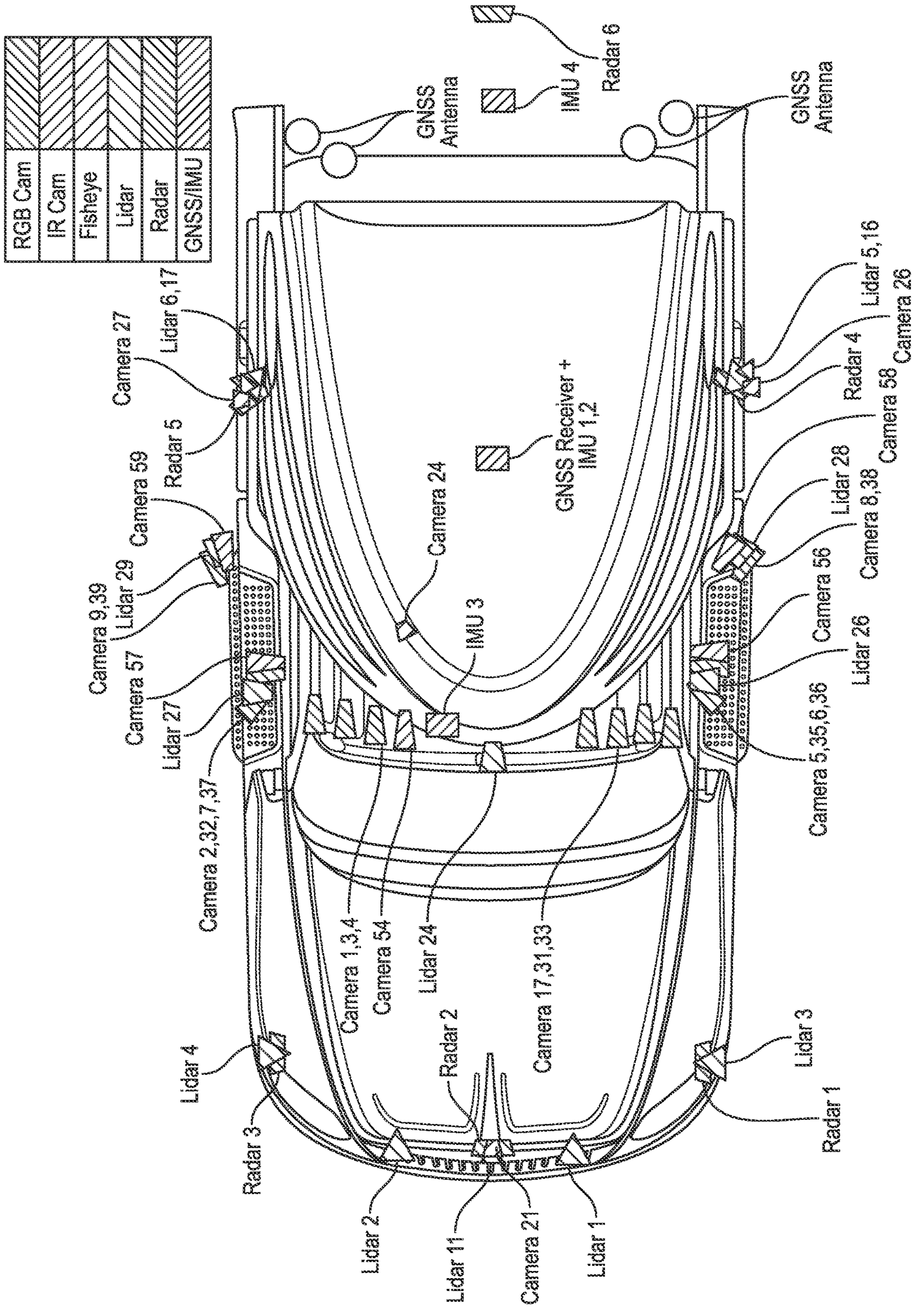
FIG. 2 shows a diagram of an example sensor system including different sensing devices located at various locations along a vehicle.

Turning now to FIG. 2, a diagram of an example sensor system (e.g., vehicle sensor subsystem 144 or a portion thereof) for use on an autonomous vehicle is provided. As shown in FIG. 2, the sensor system includes a plurality of cameras of different types, a plurality of LiDAR devices, a plurality of radar units, and a plurality of GNSS/IMU units. In particular, the cameras of the sensor system include RGB cameras, infra-red cameras (e.g., long-wave infra-red cameras), and wide-angle or fisheye cameras. In some embodiments, the LiDAR devices include long-range LiDAR devices, medium-range LiDAR devices, and short-range LiDAR devices.

As illustrated in FIG. 2, the sensing devices of the sensor system are oriented in various directions relative to the vehicle such that at least a significant portion of the environment fully surrounding the vehicle can be captured by the sensing devices. For example, some sensing devices are oriented towards a front orientation of the vehicle, while others are oriented towards the lateral sides and rear of the vehicle. In some embodiments, sensing devices are oriented to have fields-of-view (or sensing areas) overlapping with those of other sensing devices for sensing redundancy. In some examples, two or more LiDAR devices of the same type (e.g., same range type) are oriented towards the same general direction (e.g., a front direction, a side direction, a rear direction) of the vehicle to achieve component redundancy. In some examples, one or more cameras, one or more LiDAR devices, and one or more radar units are oriented in the same general direction (e.g., a front direction, a side direction, a rear direction) to achieve modality redundancy.

The sensing devices indicated in FIG. 2 are installed on the vehicle at various locations. In some embodiments, the sensing devices are installed on the vehicle via assemblies attached to the vehicle (e.g., on an exterior surface, inside of a vehicle interior). In some embodiments, the sensing devices are grouped for different levels or layers of autonomous operations, and based on the groupings, the sensing devices are operated and/or transitioned to operational states as needed based on a given level of autonomous operation.

It will be understood that the layout and orientations of sensing devices illustrated in FIG. 2 are illustrative of an example sensor system, and other example sensor systems within the scope of this document may feature different layouts and orientations of sensing devices in accordance with various embodiments described herein. For example, FIG. 2 illustrates one example sensor system in which LiDAR devices 24, 26, and 27 are respectively oriented in a front direction, a first lateral side direction, a second lateral side direction.

In other examples, LiDAR devices 26 and 27 are oriented to capture both the front direction and a lateral side direction such that respective FOVs of LiDAR devices 26 and 27 overlap with the FOV of LiDAR device 24. For example, each of LiDAR devices 26 and 27 are oriented 40 degrees away from a central axis of the vehicle (in which LiDAR device 24 is oriented). As such, the three FOVs of LiDAR devices 24, 26, and 27 overlap in an area in front of the vehicle to provide enhanced sensing in front of the vehicle.

II. Exemplary Sensing Device Assemblies

Figure 3:
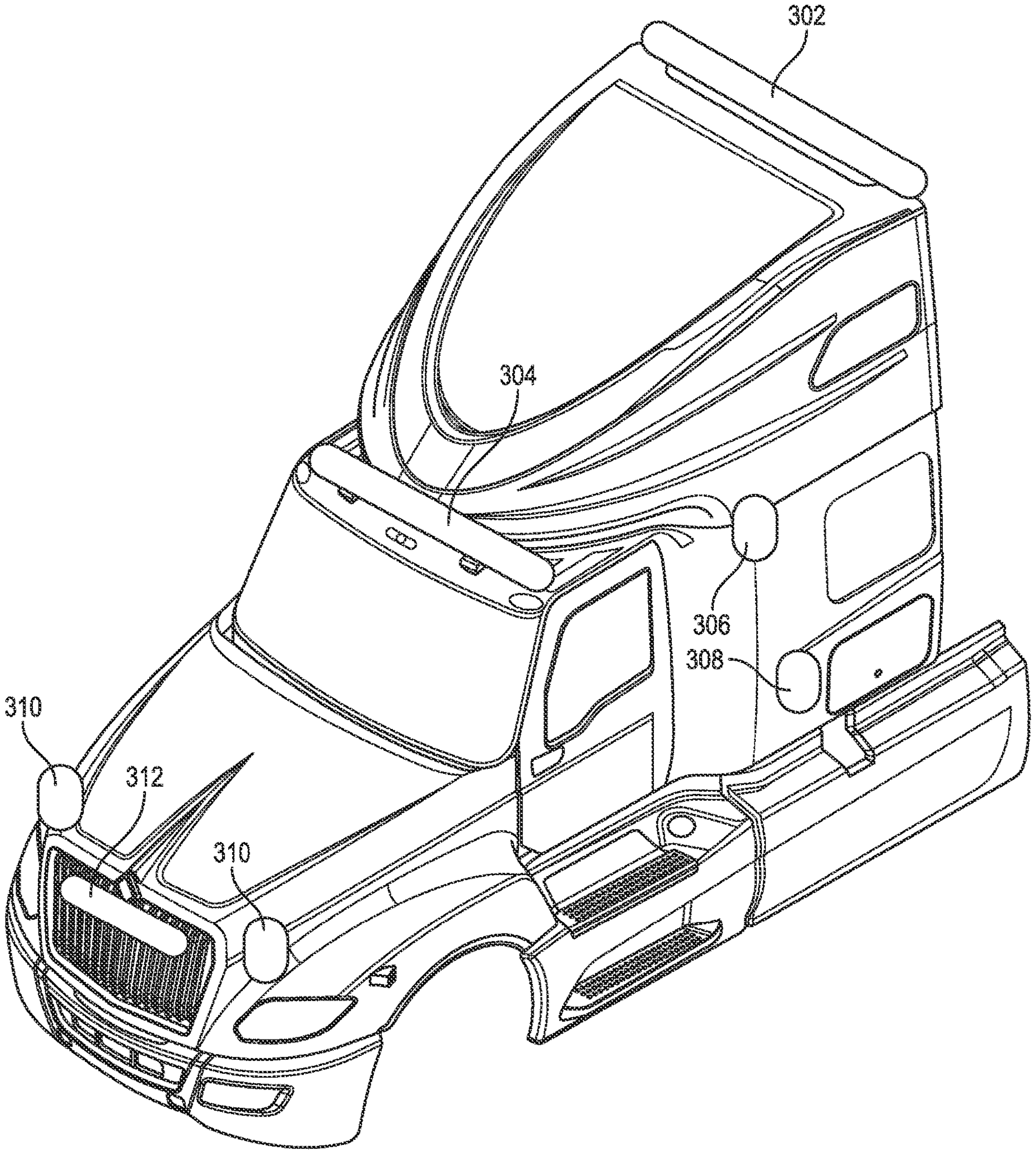
FIG. 3 shows a diagram of assemblies of an example sensor system via which sensing devices are attached to a vehicle.

FIG. 3 illustrates a plurality of assemblies (e.g., 302-312) installed on a vehicle. The assemblies are attached to the vehicle. Some assemblies (e.g., 302-312) are attached to an exterior surface of the vehicle, and in some examples, an assembly is located inside of a vehicle interior (e.g., a vehicle cabin) for sensing or monitoring of entities within the vehicle interior. In some embodiments, each assembly includes two or more sensing devices of a sensor system. An assembly includes any structure, platform, frame, assembly, and/or the like via which a sensing device is attached to a vehicle. In some embodiments, the assembly is an enclosed structure inside of which one or more sensing devices are located. Alternatively, an assembly is a platform or member connecting one or more sensing devices to the vehicle.

In some embodiments, an assembly includes a first sensing device and one or more other sensing devices configured to be redundant with the first sensing device. For example, the other sensing devices are oriented to have overlapping fields-of-view with the first sensing device. As such, in the event of a failure of the first sensing device, objects located in the field-of-view of the first sensing device can be at least partially detected by the other sensing devices.

For redundancy between sensing devices of an assembly, the assembly is configured to enable different sensing devices to be coupled or wired to different controllers located in the vehicle. In the above-described example, the first sensing device in the assembly is coupled with a first controller, and the other sensing devices in the assemblies are coupled with a second controller.

Sensing devices being located inside assemblies that are installed on a vehicle provides various technical benefits, including the improvement of integration and maintenance of the sensor system. For example, assemblies provide modularity through which subsets or groups of sensing devices can be easily removed from the vehicle for calibration, repair, or replacement. As another example, the use of assemblies reduces an amount of parts and materials needed to otherwise install each and every individual sensing device on the vehicle. In some examples, an assembly that is enclosed provides physical shelter for the sensing devices located within, thereby reducing a likelihood of impact-based failure. Enclosed assemblies further provide a slimmer and aerodynamical profile for the vehicle.

As indicated, FIG. 3 illustrates one example implementation of multiple assemblies on a vehicle. As illustrated, a roof antenna assembly 302, a main roof assembly 304, at least one side roof assembly 306, at least one side cabin assembly 308, two side hood assemblies 310, and a front hood assembly 312 are attached to an exterior surface of the vehicle.

In the illustrated example, a roof antenna assembly 302 includes GNSS antennas and/or GNSS transceivers. In the illustrated embodiment, one roof antenna assembly 302 is installed on the vehicle. In other embodiments, two or more separate roof antenna assemblies 302 are installed on the vehicle to localize failure events. The roof antenna assembly(s) 302 are installed at an upper portion of the vehicle for reliable antenna operation.

In the illustrated example, a main roof assembly 304 includes RGB cameras and IR (e.g., LWIR) cameras that are oriented in a front orientation and/or a side orientation of the vehicle. The main roof assembly 304 may also include front and/or side oriented LiDAR devices. In particular, the main roof assembly 304 includes LiDAR devices configured for long-range sensing, in some embodiments. In some embodiments, the main roof assembly 304 includes an IMU unit. In some embodiments, the IMU unit of the main roof assembly 304 is a GNSS/IMU integrated unit. In some embodiments, the main roof assembly 304 is located at a roof of the vehicle or at a relatively upper portion of the vehicle such that the long-range sensing devices located inside of the main roof assembly 304 can sense longer distances away from the vehicle.

The illustrated example further illustrates a side roof assembly 306, and two or more side roof assemblies 306 may be installed on the vehicle. Each side roof assembly 306 may include rear-oriented RGB and IR cameras, as well as rear-oriented long-range LiDAR devices.

In the illustrated example, two or more side cabin assemblies 308 are installed on the vehicle. Each side cabin assembly 308 includes rear-oriented LiDAR devices that are configured for medium-range sensing. In some examples, the sensor system includes rear-oriented LiDAR devices that are configured for long-range sensing or medium-range sensing, and the long-range LiDAR devices and the medium-range LiDAR devices may be interchangeably located in a side roof assembly 306 or a side cabin assembly 308. In some embodiments, the long-range LiDAR devices are located at a higher location on the vehicle than the medium-range LiDAR devices. In some embodiments, the side cabin assemblies 308 further include side-oriented wide-angle cameras and short-range LiDAR devices.

In the illustrated example, side hood assemblies 310 are installed on the vehicle. Each side hood assembly 310 is located at a front corner of the vehicle. In some embodiments, each side hood assembly 310 includes radar units and LiDAR devices oriented towards respective sides of the vehicle. With the side hood assemblies 310 being located at the front corners of the vehicle, the side-oriented sensing devices are particularly used for intersection operations performed while objects may be detected to the side of the vehicle. In some embodiments, the side hood assemblies 310 further include front-oriented mid-range LiDAR devices.

In the illustrated example, a front hood assembly 312 is installed on the vehicle. The front hood assembly 312 includes front-oriented LiDAR devices that may be configured for medium-range sensing or short-range sensing. The front hood assembly 312 further includes front-oriented radar units and one or more wide-angle cameras. In some embodiments, the two side hood assemblies 310 and the front hood assembly 312 are embodied by one assembly that spans the front and side of the vehicle.

In some embodiments, each assembly inside of which sensing devices are located includes a sensor heating/cleaning system. In some embodiments, the sensor heating/cleaning system for each assembly includes a set of devices configured to heat and/or clean the sensing devices of the assembly, such that detection capabilities of the sensing devices is maintained in different conditions. For example, the sensor heating/cleaning system includes heating devices operable to defrost camera lens, LiDAR windows, radar radomes, and/or the like.

In some examples, such heating devices are automatically operated in response to an environmental or ambient temperature being less than a threshold temperature (e.g., according to temperature data collected by a thermometer or temperature sensor). In some examples, the heating devices are automatically operated in response to a decline in image or data quality being determined. In some examples, the heating devices include heating coils/wires, heating pads (e.g., attached to a sensing device), radiators or space heaters, and/or the like.

In some examples, the sensor heating/cleaning system includes cleaning devices operable to clean camera lens, LiDAR windows, radar radomes, and/or the like. In some example instances, as the vehicle travels, sensing devices become obstructed by debris, rain droplets, mud, bugs, and/or the like. In some embodiments, the cleaning devices are automatically operated in response to detection of such obstructions. For example, an obstructing object is detected in images captured by a camera, and based on the detection, cleaning devices for the camera or for the assembly at which the camera is located are operated. In some embodiments, the cleaning devices are automatically operated in response to the vehicle being located within certain environmental conditions, such as heavy rain. In some examples, the cleaning devices include wipers, misters, sprayers, hoses, and/or the like.

In some embodiments, the assemblies are arranged to be symmetrical across a longitudinal axis of the vehicle, as illustrated in FIG. 3.

III. Exemplary Sensor Redundancy

According to example embodiments, sensing devices of a sensor system are associated with different levels of autonomous operation of a vehicle, such that different sensing devices are operated depending on the autonomous operation of the vehicle. In some embodiments, association of a sensing device with a particular level of autonomous operation indicates that the sensing device is operated while the vehicle is in the particular level of autonomous operation.

In some embodiments, a first group or subset of the sensing devices of a sensor system are associated with an essential level of autonomous operation. The first group includes sensing devices that are identified as essential or required for autonomous operation of the vehicle. For example, the first group includes sensing devices that are needed to perform object detection operations for up to a pre-determined distance or range away from the vehicle and/or for within a pre-determined span of orientations around the vehicle. In some embodiments, the first group of "essential" sensing devices (or "operation" sensing devices) are configured and intended for continued use while the vehicle is being autonomously operated, or while the vehicle is at a base level of autonomous operation.

In some embodiments, a second group or subset of the sensing devices of a sensor system are associated with a non-essential level of autonomous operation. Sensing devices of the second group are configured to be redundant with and/or to supplement sensing devices of the first group. For example, some sensing devices of the second group correspond to some sensing devices of the first group and are configured as direct backups in the event of failure of the corresponding sensing devices of the first group. As another example, a sensing device of the second group is configured to collect data that supplements or enhances data collected by sensing devices of the first group. For example, the second group includes LWIR cameras configured for night vision to enhance potentially inadequate image data collected by RGB cameras.

Thus, in some embodiments, the non-essential level of autonomous operation is a redundant, fail-operational, and/or performance-enhancing level of autonomous operation above the essential level of autonomous operation. In some embodiments, the second group of sensing devices includes backup sensing devices and "nice-to-have" sensing devices that improve perception capability but are not crucial for perception operations.

In some embodiments, the sensing devices of the second group are defaulted to a non-operational state to conserve power and minimize excess communications. Upon certain conditions being satisfied (e.g., detection of a failure condition, the vehicle being located in a low visibility environment), the sensing devices of the second group are caused to transition to an operational state in which the sensing devices collect sensor data that is redundant with sensor data collected by the first group, or sensor data that enhances and supplements the sensor data collected by the first group. For example, the sensing devices of the second group are supplied power when transitioned to the operational state. As another example, an instruction to initiate data collection is transmitted to the sensing devices of the second group to transition to the operational state.

According to example embodiments, each of the first group and the second group of sensing devices include RGB cameras, and the RGB cameras of the first group correspond to backup RGB cameras of the second group. In some embodiments, the backup RGB cameras of the second group have overlapping FOVs with corresponding RGB cameras of the first group to provide redundancy. In the illustrated example of FIG. 2, for example, RGB cameras 1-9 and 17 belong to a first group, and RGB cameras 31-39 belong to a second group (with camera 31 corresponding to camera 1, camera 32 corresponding to camera 2, and so on). Accordingly, upon detection of a failure condition with a given RGB camera of the first group, the corresponding backup RGB camera of the second group is caused to transition to an operational state, in some embodiments.

In the illustrated example of FIG. 2, the first group of essential sensing devices includes long-range LiDAR devices 24, 28, and 29, which are front-oriented or rear-oriented. In the illustrated example of FIG. 2, the first group of essential sensing devices further includes medium-range LiDAR devices 1-9. In the illustrated example of FIG. 2, the second group of non-essential (e.g., redundant, performance-enhancing) sensing devices includes short-range LiDAR devices 11-19. In some embodiments, LiDAR devices of the second group are configured for a range that is less than or equal to LiDAR devices of the first group.

In some embodiments, at least one of the medium-range LiDAR devices (e.g., LiDAR device 2) is included in the second group as a redundant backup to another medium-range LiDAR device, which is included in the first group. In the illustrated example, medium-range LiDAR device 2 is identified as non-essential and is used with essential LiDAR device 1 to boost front perception distance. Accordingly, LiDAR device 2 is transitioned to an operational state in response to a determination that the front perception distance supplied by LiDAR device 1 by itself is insufficient, in some embodiments.

In accordance with the second group including performance-enhancing or supplemental sensing devices, the second group includes infra-red cameras (e.g., cameras 51-59 in FIG. 2), which are used in low-visibility conditions such as nighttime, fog environments, rain environments, and/or the like. In some embodiments, the second group includes wide-angle or fisheye cameras (e.g., cameras 21-28 in FIG. 2). In some embodiments, the second group includes the radar units of the sensor system, which are used to supplement object detection capabilities provided by the cameras and LiDAR devices of the first group.

In some embodiments, the sensing devices of the first group and the sending devices of the second group are connected to separate controllers and have independent wiring, power distribution, network topology, data flow, software modules, and/or the like. As such, failure events are localized within the first group or within the second group.

In some embodiments, sensing devices are associated with priority levels corresponding to the different levels of autonomous operation of the vehicle, with sensor data collected by the sensing devices being processed and communicated in an order according to the priority levels. For example, sensor data collected by essential sensing devices is prioritized in data transmission, processing, error control or discrepancies, and/or the like over sensor data collected by non-essential sensing devices.

IV. Exemplary Camera Layouts

Turning now to FIGS. 4-8, example layouts and orientations of cameras of an example sensor system are illustrated. While individual cameras are indicated in FIGS. 4-8, some individual cameras are located within a same assembly, as indicated and described in the context of FIG. 3 for example. In some embodiments, the cameras are configured to collect image data that captures the environment surrounding the vehicle, and the image data is used (e.g., by the in-vehicle control computer 150) for object detection, traffic light/sign recognition, and lane marking detection.

Figure 4:
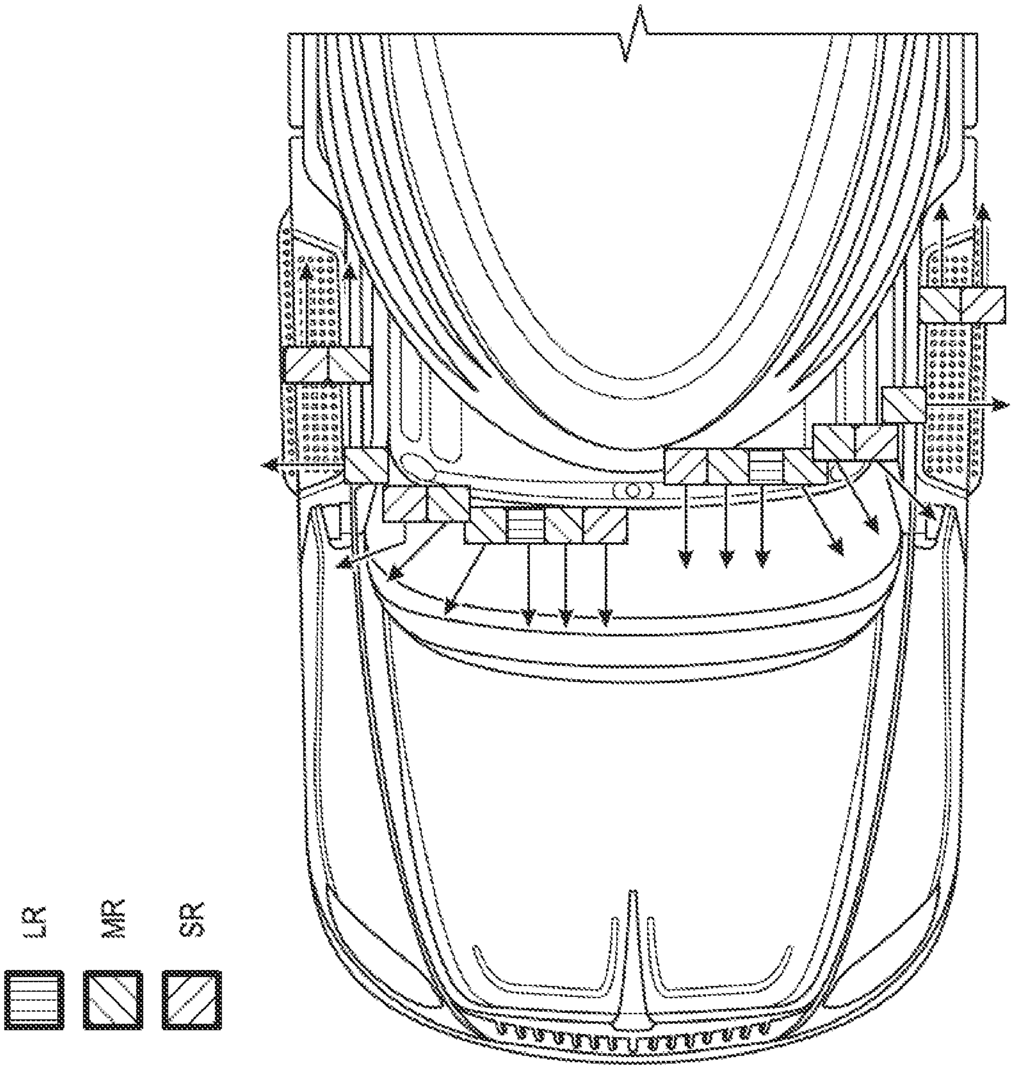
FIG. 4 shows a diagram of cameras of an example sensor system that are associated with different ranges and that are located at various locations along a vehicle.

FIG. 4 illustrates cameras of different ranges being located on a vehicle. In some embodiments, the cameras include long-range cameras (LR), medium-range cameras (MR), and short-range cameras (SR). The use of multiple cameras of different ranges enables maximization of a sensing distance while minimizing blind spots around the vehicle. For example, the long-range cameras can collect image data for environments located far from the vehicle, while the medium-range cameras and the short-range cameras can collect image data for the blind spots of the long-range cameras.

As illustrated in FIG. 4, the cameras are oriented in different directions that fan or span around the vehicle. In some embodiments, the cameras are configured such that respective fields-of-view overlap in a horizontal plane by at least a predetermined amount. For example, adjacent cameras have fields-of-view (FOVs) that overlap by at least 12 degrees, at least 15 degrees, or at least 20 degrees. With the overlap in camera FOVs, objects that are fast-moving relative to the vehicle can be tracked across image data collected by different cameras.

Figure 5:
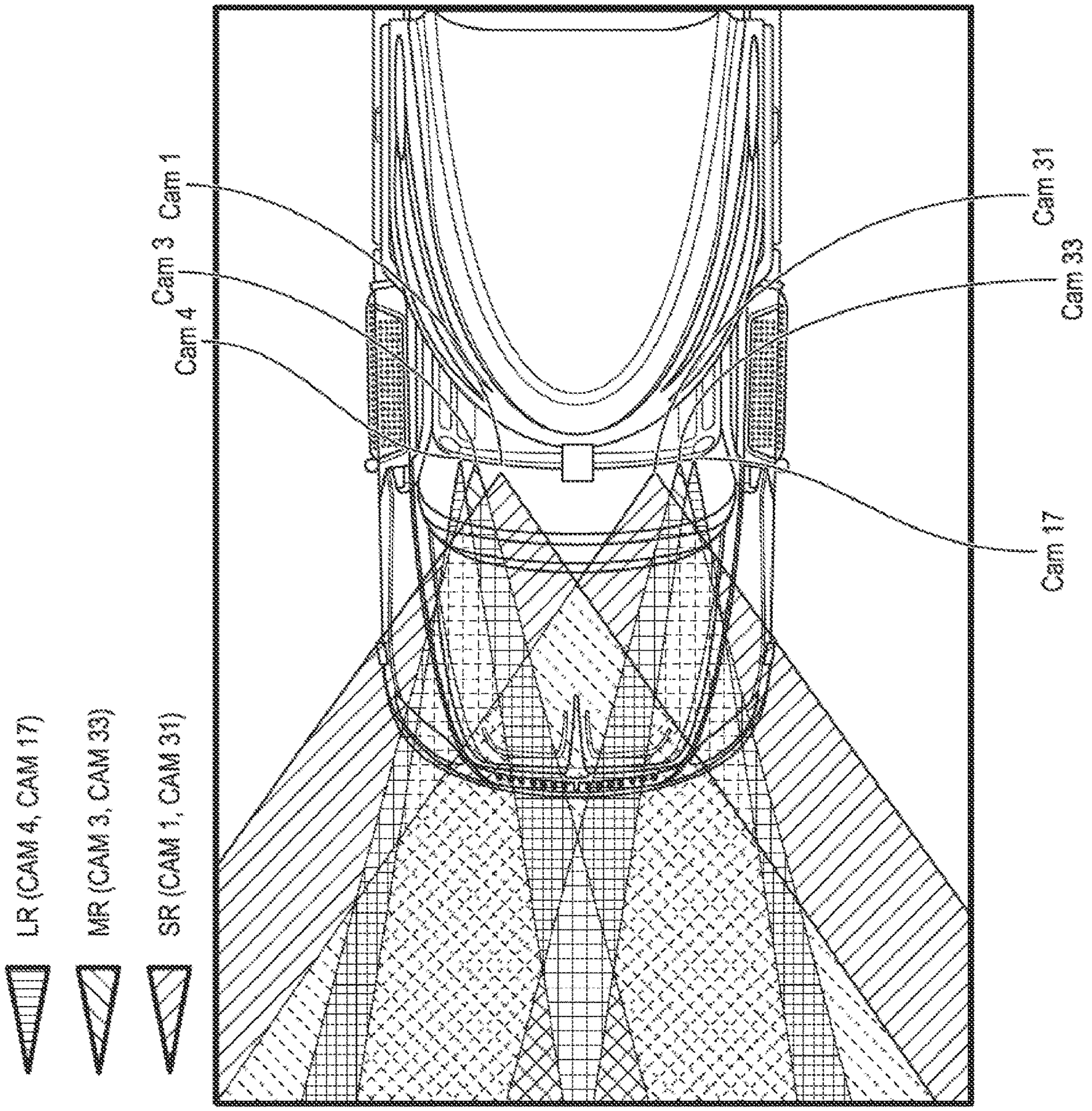
FIG. 5 shows a diagram of overlapping fields-of-view of cameras of an example sensor system.

FIG. 5 illustrates overlapping FOVs of cameras oriented towards a front direction of the vehicle. In the illustrated example, two long-range cameras are oriented towards the front direction of the vehicle and provide long-range object detection. Further, the two long-range cameras are used for object ranging using stereovision techniques. In the illustrated example, medium-range cameras and short-range cameras are oriented to fill the blind spots of the long-range cameras, which have relatively narrower fields-of-view compared to the medium-range and short-range cameras.

In the illustrated example, the cameras on opposite lateral sides of the vehicle are configured to be redundant backups for each other. For example, Cam 31 is configured to be a redundant backup for Cam 1. As such, some of the example cameras indicated in FIG. 5 are associated with a non-essential level of autonomous operation, while others are associated with an essential level of autonomous operation. In some embodiments, redundant cameras are transitioned to an operational state in response to a fault condition being detected for a corresponding essential camera.

In some embodiments, the cameras indicated in FIG. 5 are located inside of an assembly, such as the main roof assembly 304 illustrated in FIG. 3. In some embodiments, the cameras are located in locations spread or distributed across the roof, such that a given camera is at least a pre-determined distance away from a nearest camera. In some examples, the pre-determined distance is a safety distance. Accordingly, with distribution of cameras over an area on the vehicle, a likelihood that multiple cameras are blocked by water, dirt, or debris or are cleaned at the same time is minimized. In some examples, a pair of primary and redundant cameras (e.g., long-range cameras, medium-range cameras, short-range cameras) are distributed symmetrically across a center axis of the vehicle so that the primary and redundant cameras are separated by at least a pre-determined distance. By doing so, a likelihood of both of the cameras being obstructed is reduced, and use of the pair of cameras for stereovision distance estimation is enabled.

Figure 6:
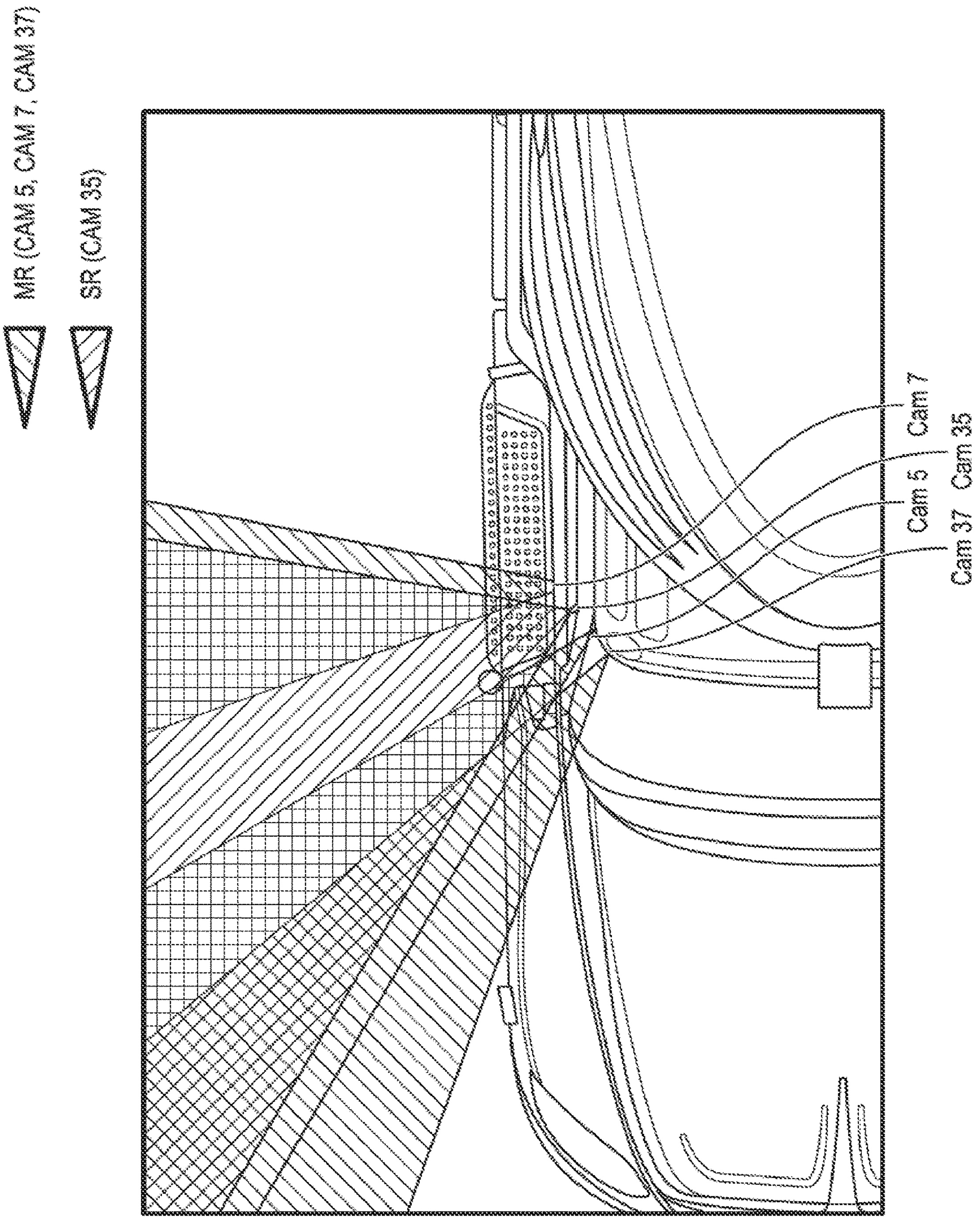
FIG. 6 shows another diagram of overlapping fields-of-view of cameras of an example sensor system.

FIG. 6 illustrates overlapping FOVs of cameras oriented towards a side or lateral direction of the vehicle. In some embodiments, cameras that are oriented towards a lateral direction of the vehicle are configured for medium-range imaging or short-range imaging. For example, FIG. 6 illustrates medium-range cameras and short-range cameras being oriented towards the lateral direction of the vehicle. In some embodiments, laterally-oriented cameras are configured to collect image data used for object detection during vehicle turning operations.

Figure 7:
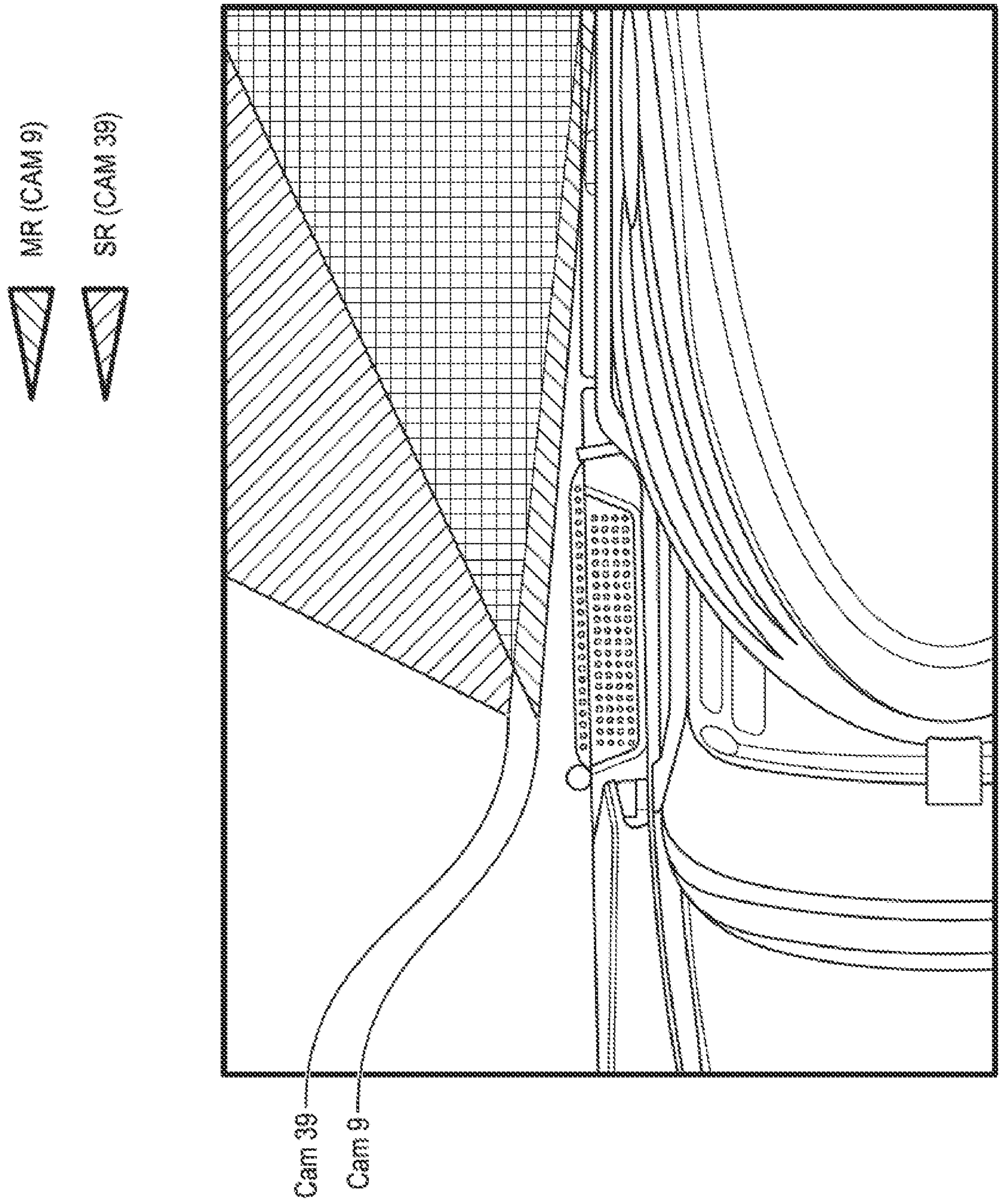
FIG. 7 shows another diagram of overlapping fields-of-view of cameras of an example sensor system.

FIG. 7 illustrates overlapping FOVs of cameras that are installed on a side of the vehicle and that are oriented towards a rear of the vehicle. As indicated in FIG. 7, the rear-oriented cameras are configured for medium-range imaging or short-range imaging. In particular, in the illustrated example, a combination of medium-range cameras and short-range cameras are used for object detection towards a rear of the vehicle, which balances detection range and detection field-of-view.

Figure 8:
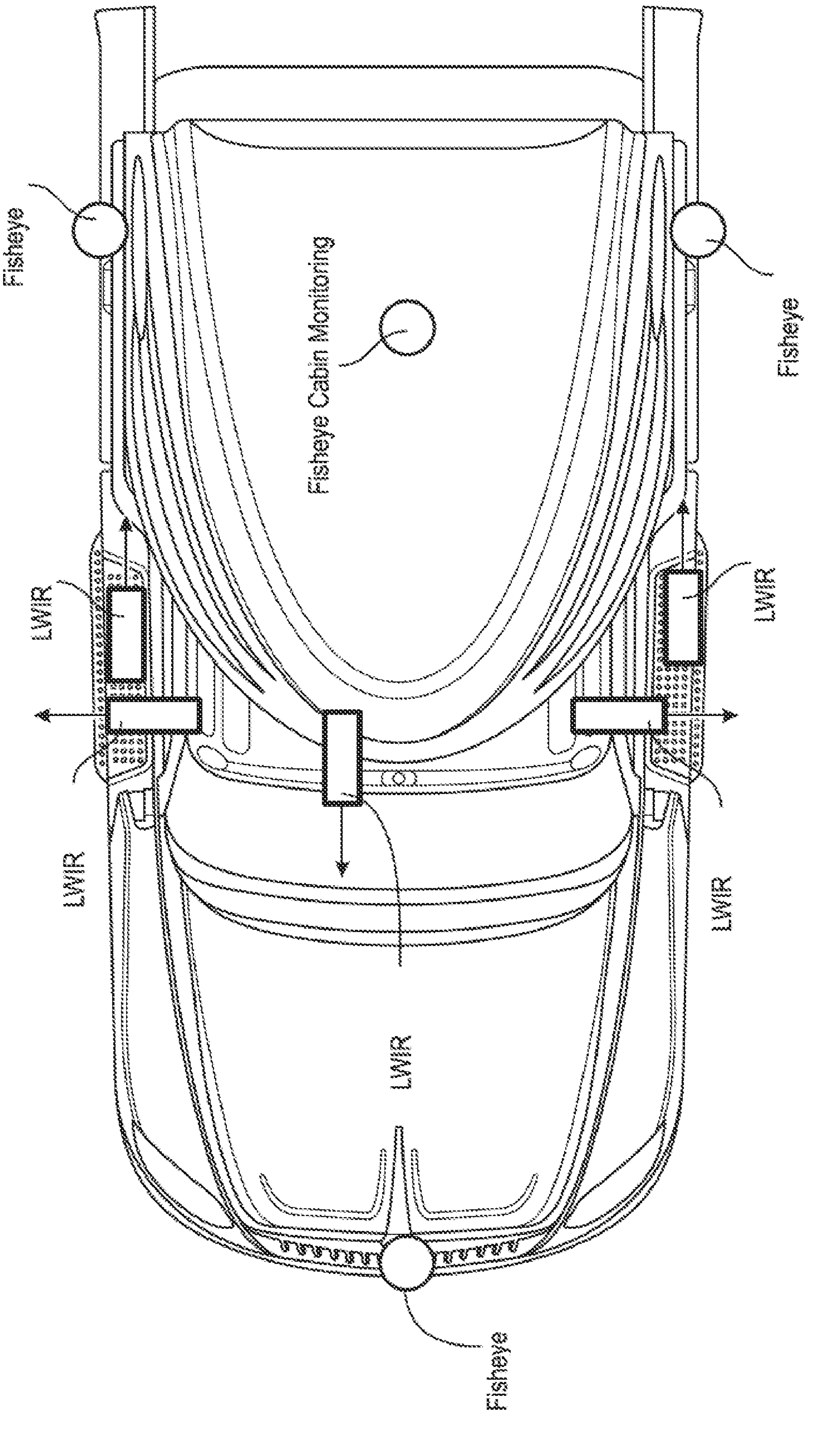
FIG. 8 shows a diagram of an example layout of cameras that are associated with a non-essential level of autonomous operation of a vehicle.

FIG. 8 illustrates other camera types being located on the vehicle. In particular, FIG. 8 identifies fisheye cameras and LWIR cameras located at various locations along the vehicle. In some embodiments, the fisheye cameras and LWIR cameras are considered non-essential sensing devices, or sensing devices that enhance performance and provide redundancy for essential sensing devices. As such, in some embodiments, the cameras indicated in FIG. 8 are transitioned to operational states in response to certain conditions being detected and in normal conditions, are in non-operational states to conserve power and resources. For example, the LWIR cameras are used while the vehicle is operating at night or in low visibility conditions (e.g., fog, heavy rain).

As illustrated in FIG. 8, fisheye cameras are located at a front and lateral sides of the vehicle and are configured to fill blind spots of other cameras, such as those indicated in FIGS. 4-7. In some embodiments, the fisheye cameras are configured to collect image data used for lane marking detection on the sides of the vehicle and for operating the vehicle within lane markings on a roadway. In some embodiments, a fisheye camera is located in a vehicle cabin and used to monitor an interior of the vehicle cabin. For example, a fisheye camera monitors a human operator located inside the vehicle cabin.

V. Exemplary LiDAR Layouts

FIGS. 9-16 illustrate example configurations and layouts of LiDAR devices of a sensor system (e.g., vehicle sensor subsystem 144) for use with a vehicle. In some embodiments, the LiDAR devices illustrated in FIGS. 9-16 include essential LiDAR devices and non-essential (e.g., performance enhancing, redundant) LiDAR devices. In some embodiments, essential LiDAR devices include LiDAR devices configured for long-range and medium-range sensing, and non-essential LiDAR devices include LiDAR devices configured for short-range sensing. In some embodiments, the LiDAR devices for the vehicle are solid-state non-spinning LiDAR devices, thereby improving reliability and lowering resource costs when operating the vehicle. In some embodiments, the LiDAR devices illustrated in FIGS. 9-16 are configured to measure ranges to objects, azimuth or elevation angles, and reflectivity of objects.

Figure 9:
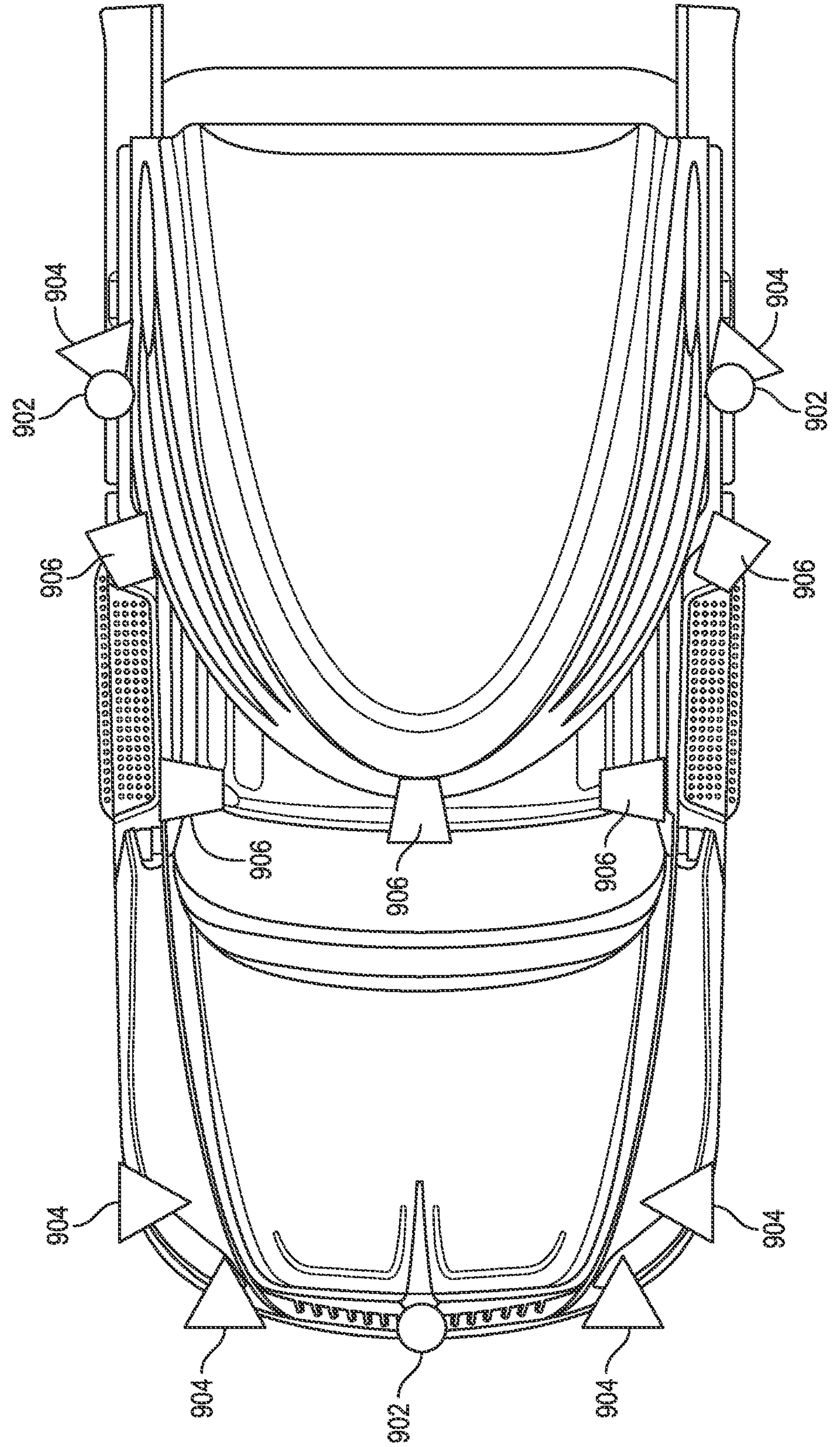
FIG. 9 shows a diagram of LiDAR devices of an example sensor system that are located at various location along a vehicle.

FIG. 9 illustrates one example layout of LiDAR devices of a sensor system. While individual LiDAR devices are indicated in FIG. 9, the LiDAR devices are located inside of various assemblies, in some embodiments. In some embodiments, a given assembly includes two or more of the LiDAR devices indicated in FIG. 9.

The LiDAR devices as arranged in FIG. 9 cover the front direction, the lateral side directions, and the rear direction of the vehicle. In some embodiments, redundant coverage is provided with at least two LiDAR devices oriented towards each direction. Accordingly, for a given direction of the vehicle (e.g., front, side, rear), at least one LiDAR device is associated with an essential level of autonomous operation, while at least one other LiDAR device is associated with a non-essential level of autonomous operation as a backup for the at least one essential LiDAR device.

In the illustrated example of FIG. 9, three short-range LiDAR devices 902 are located at the front and lateral sides of the vehicle (e.g., inside of respective assemblies). In some embodiments, a short-range LiDAR device 902 located at the front of the vehicle provides blind zone coverage for other LiDAR devices that are oriented towards the front direction of the vehicle, and is used during autonomous operation for a safe start of the vehicle from a parked state. The short-range LiDAR devices 902 located at the sides of the vehicle also cover blind spots of other LiDAR devices and enables detection of trailer angle. For example, a short-range LiDAR device 902 senses a portion of a trailer attached to the rear of the vehicle, and based on the sensed portion of the trailer, an angle between the trailer and the vehicle (e.g., a tractor) is determined.

In the illustrated example of FIG. 9, six medium-range LiDAR devices 904 are installed on the vehicle (e.g., via respective assemblies). In some embodiments, two of the medium-range LiDAR devices 904 are oriented towards the front direction of the vehicle and are redundant to each other. As such, one front-oriented medium-range LiDAR device is associated with an essential level of autonomous operation, and the other front-oriented medium-range LiDAR device is associated with a non-essential level of autonomous operation, in some examples.

The front-oriented medium-range LiDAR devices are each configured to be used for general front object detection and lane marking detection. In some examples, the two front-oriented medium-range LiDAR devices are used together to boost perception range. For example, a non-essential front-oriented LiDAR device is transitioned to an operational state (e.g., toggled or powered on) in response to a determination that a current perception range is insufficient. With at least two LiDAR devices being used together, point clouds are combined such that further objects are captured with an increased number of points. With more points for further objects, object recognition accuracy for the further objects is improved.

The medium-range LiDAR devices 904 that are oriented in lateral side directions of the vehicle are configured to be used for object detection at intersections, or locations at which objects approach the vehicle from the lateral side directions of the vehicle. As illustrated in FIG. 9, some side-oriented medium-range LiDAR devices are located at the front corner of the vehicle, such that such side-oriented medium-range LiDAR devices are used for intersection object detection while the vehicle is safely located outside of the intersection. Accordingly, side-oriented medium-range LiDAR devices being located at or near the front end of the vehicle enables the vehicle to “peek” around corners while maintain a safe position or posture. In some embodiments, the side-oriented medium-range LiDAR devices are located in the side hood assemblies 310 and/or the front hood assembly 312.

Other side-oriented medium-range LiDAR device are located at more rearward positions of the vehicle and are configured for object detection at the sides of the vehicle, object detection while the vehicle performs lane changing operations, and/or the like. With some of the short-range LiDAR devices installed on the vehicle, some side-oriented medium-range LiDAR devices are configured for use with trailer angle detection.

In the illustrated example of FIG. 9, five long-range LiDAR devices 906 are installed on the vehicle (e.g., via one or more assemblies). In some embodiments, the long-range LiDAR devices 906 are oriented towards a front direction of the vehicle, side directions of the vehicle, and a rear direction of the vehicle. In some embodiments, a front-oriented long-range LiDAR device is configured for use with long-range front object detection, such as road debris detection. In some embodiments, side-oriented long-range LiDAR devices are used for intersection or lateral object detection. For example, the side-oriented long-range LiDAR devices are used in connection with the side-oriented medium-range LiDAR devices at times when the vehicle is approaching an intersection, stopped at an intersection, travelling through an intersection, and exiting an intersection. In some embodiments, rear-oriented long-range LiDAR devices are configured for long-range object detection while the vehicle is performing lane changing operations.

As discussed, each of the LiDAR devices indicated in FIG. 9 are used for autonomous operation of a vehicle, and some of the LiDAR devices are further used for specific autonomous operations related to lane changing, intersections, and/or the like. In some embodiments, for a given autonomous operation, some LiDAR devices are identified as essential while others are identified as non-essential. Accordingly, for different autonomous operations, a given LiDAR device can be essential (e.g., operation-required) or non-essential (e.g., performance enhancing), in some embodiments.

In some embodiments, the specific autonomous operations, such as those related to lane changing, intersections, and/or the like, are identified as conditions responsive to which some LiDAR devices are transitioned to an operation state. For example, side-oriented medium-range LiDAR devices are identified as non-essential for a general autonomous operation of the vehicle and are transitioned to an operational state in response to a determination that the vehicle is located at an intersection.

Figure 10:
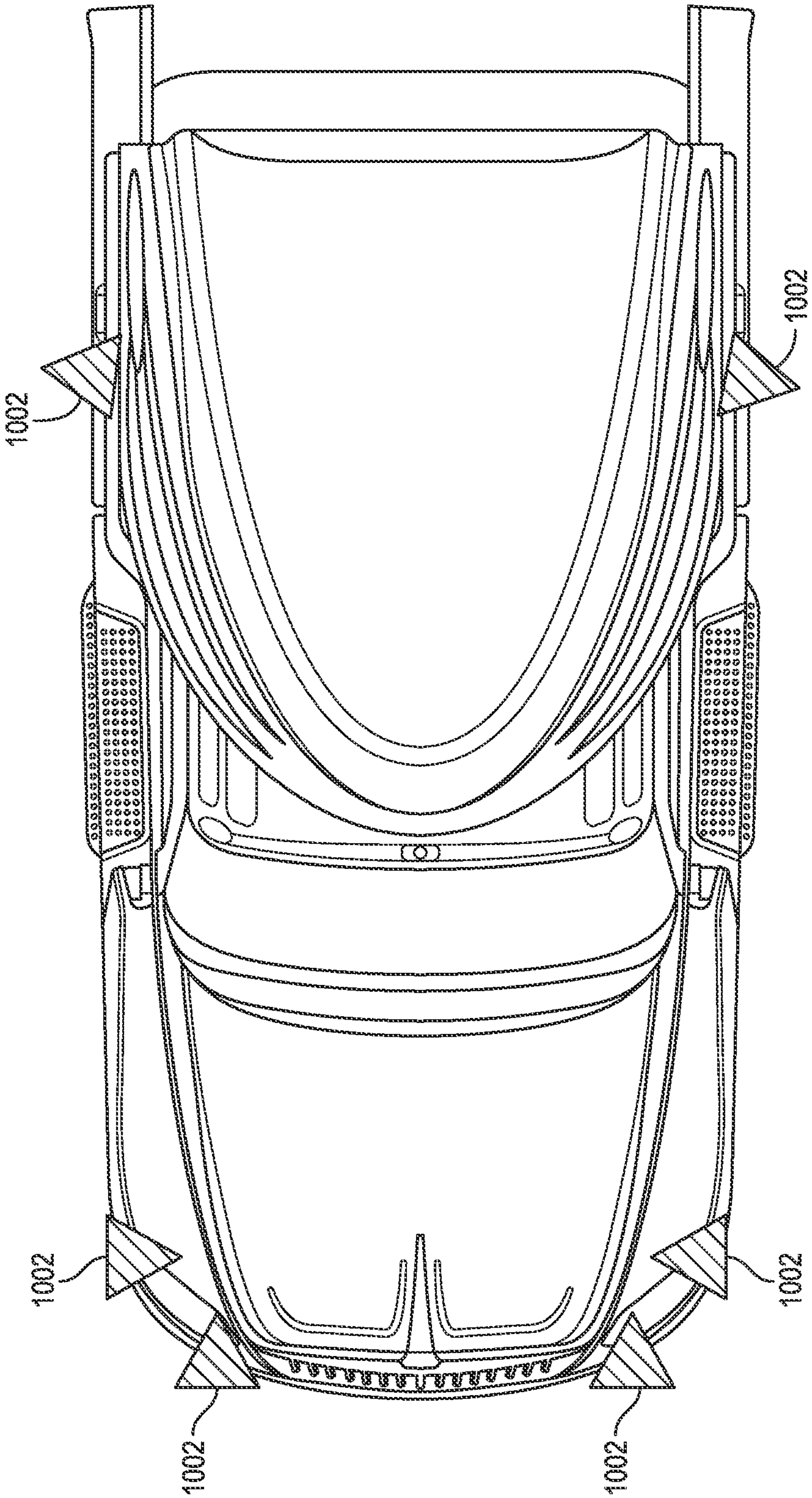
FIG. 10 shows another diagram of LiDAR devices of an example sensor system that are located at various location along a vehicle.

FIG. 10 illustrates another example layout of LiDAR devices 1002 of a sensor system for use with a vehicle. In the illustrated example of FIG. 10, six LiDAR devices 1002 are installed on the vehicle (e.g., via one or more assemblies). In some embodiments, each of the six LiDAR devices are solid-state non-spinning LiDAR devices.

In the illustrated example of FIG. 10, two LiDAR devices 1002 are front-oriented, two are side-oriented, and two are rear-oriented. The front-oriented LiDAR devices provide redundant front object detection and respective point clouds of the front-oriented LiDAR devices are stitched to boost front perception range. The side-oriented LiDAR devices are located at or near a front end of the vehicle and provide side object detection. For example, the side-oriented LiDAR devices are used for intersection object detection while the vehicle is safely located outside of the intersection. The rear-oriented LiDAR devices provide trailer angle detection based on respective FOVs overlapping with a trailer body. In some embodiments, the FOVs of the rear-oriented LiDAR devices overlap with the vehicle body by a predetermined amount (e.g., 2 degrees, 2.5 degrees, 3 degrees).

Figure 11:
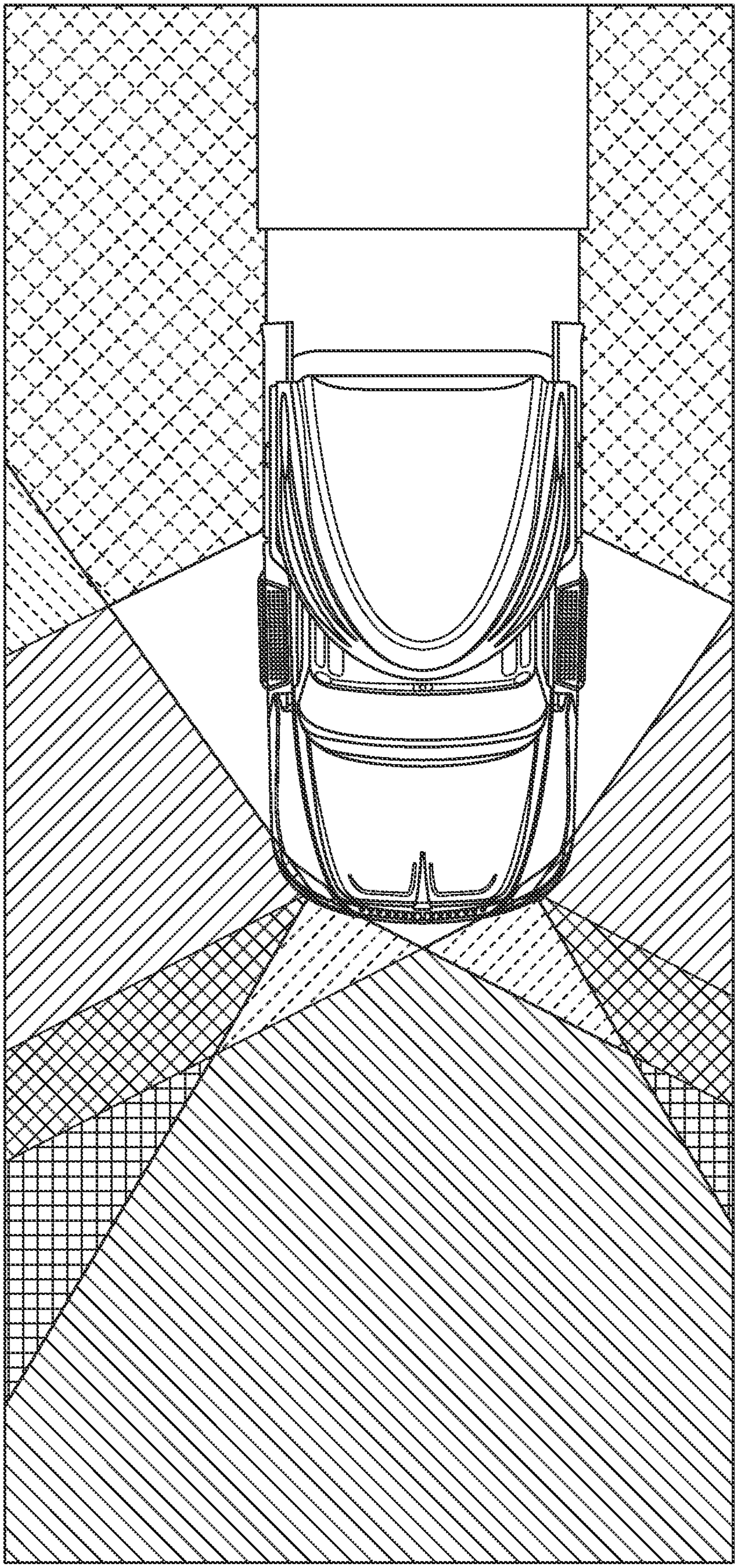
FIG. 11 shows a diagram of fields-of-view of LiDAR devices of an example sensor system for use with an autonomous vehicle.

FIG. 11 illustrates the respective FOVs of the LiDAR devices 1002 indicated in FIG. 10. As shown, the respective FOVs of the front-oriented LiDAR devices significantly overlap and are configured to be redundant with each other. The respective FOVs of the side-oriented LiDAR devices face lateral directions of the vehicle. The respective FOVs of the rear-oriented LiDAR devices overlap with the vehicle body, such that the rear-oriented LiDAR devices are configured for use with trailer angle detection. In some embodiments, a trailer angle is determined based on obtaining point cloud data from at least one rear-oriented LiDAR device, identifying a portion of the point cloud data that captures the vehicle body, and based on an amount of the portion of the point cloud data, determining a trailer angle. In some embodiments, driving-related operations are further determined using the trailer angle. In some embodiments, each of the LiDAR devices indicated in FIG. 11 are medium-range LiDAR devices, and the FOVs illustrated in FIG. 11 are shaded to demonstrate the overlapping of the FOVs.

Figure 12A:
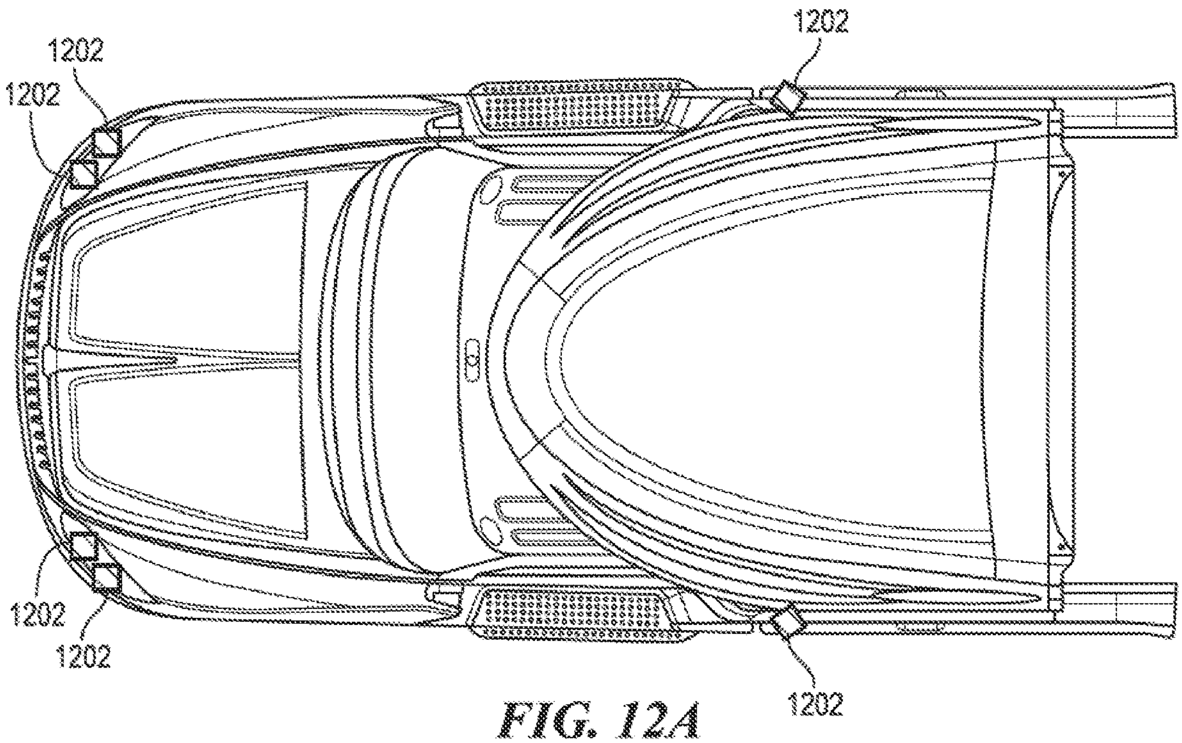
FIGS. 12A and 12B show diagrams of example layouts of LiDAR devices of an example sensor system along a vehicle.
Figure 12B:
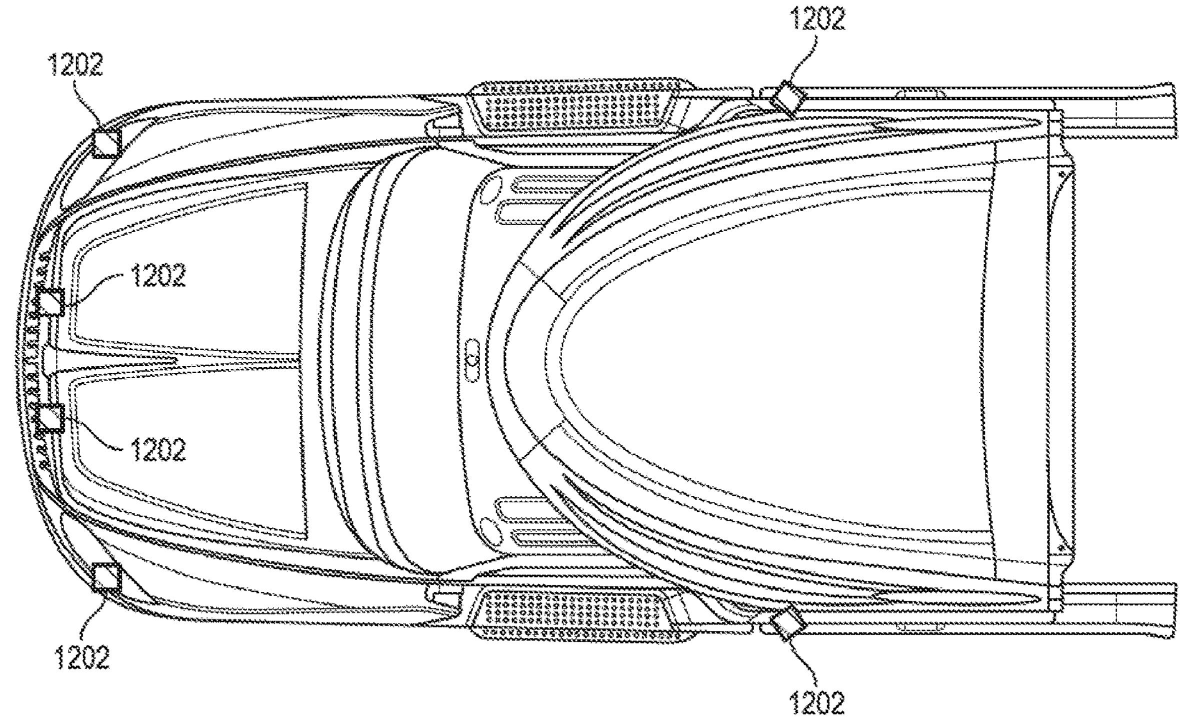

FIGS. 12A and 12B illustrate other example layouts of LiDAR devices 1202 of a sensor system. For example, the LiDAR device layouts of FIGS. 12A and 12B include six LiDAR devices and can be implemented as variations of the layout illustrated in FIG. 10. Two of the LiDAR devices 1202 are located at the front end of the vehicle and oriented towards lateral side directions of the vehicle.

Figure 13A:
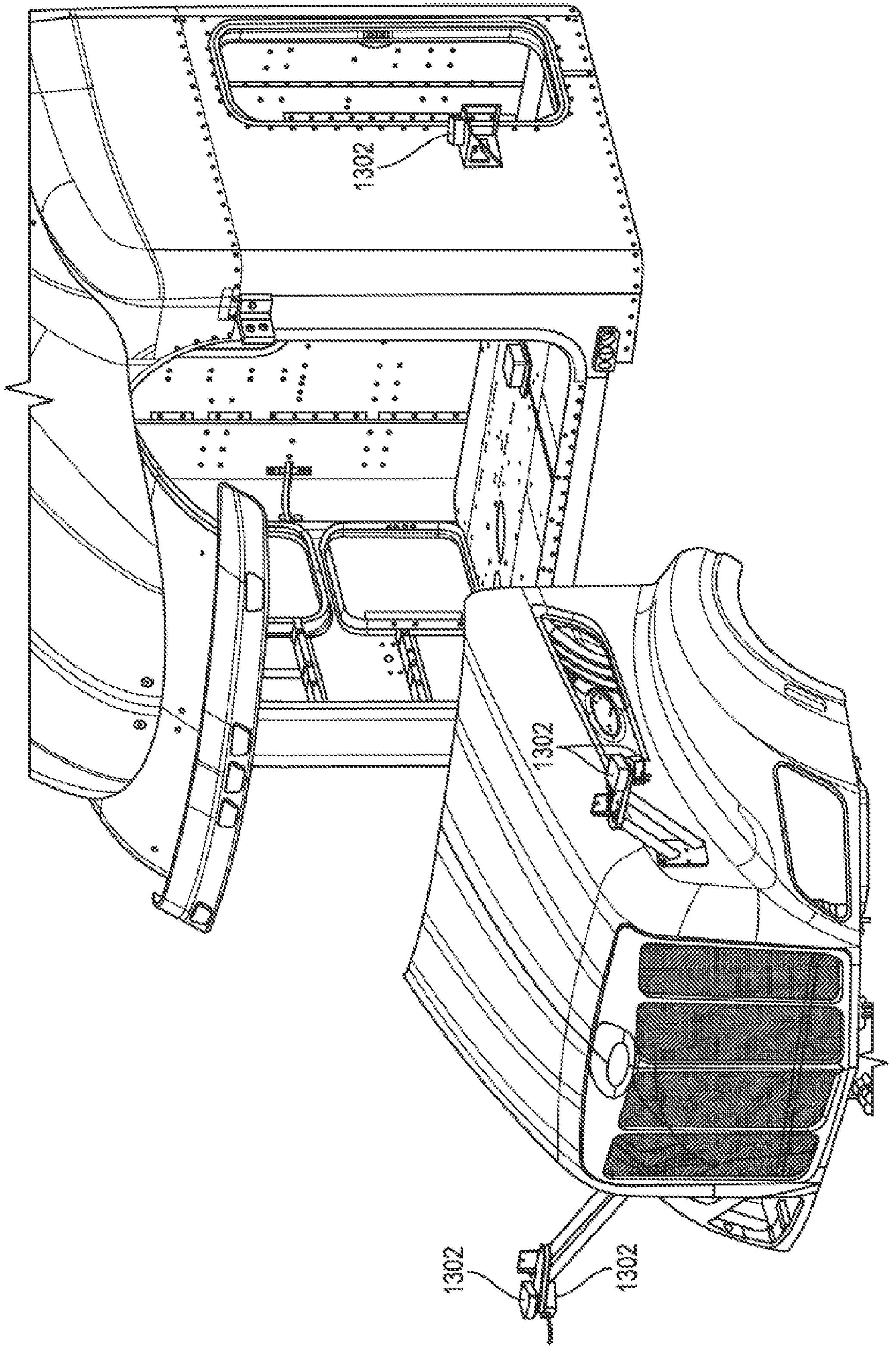
FIGS. 13A and 13B show perspective views of LiDAR devices of an example sensor system that are attached to a vehicle.
Figure 13B:
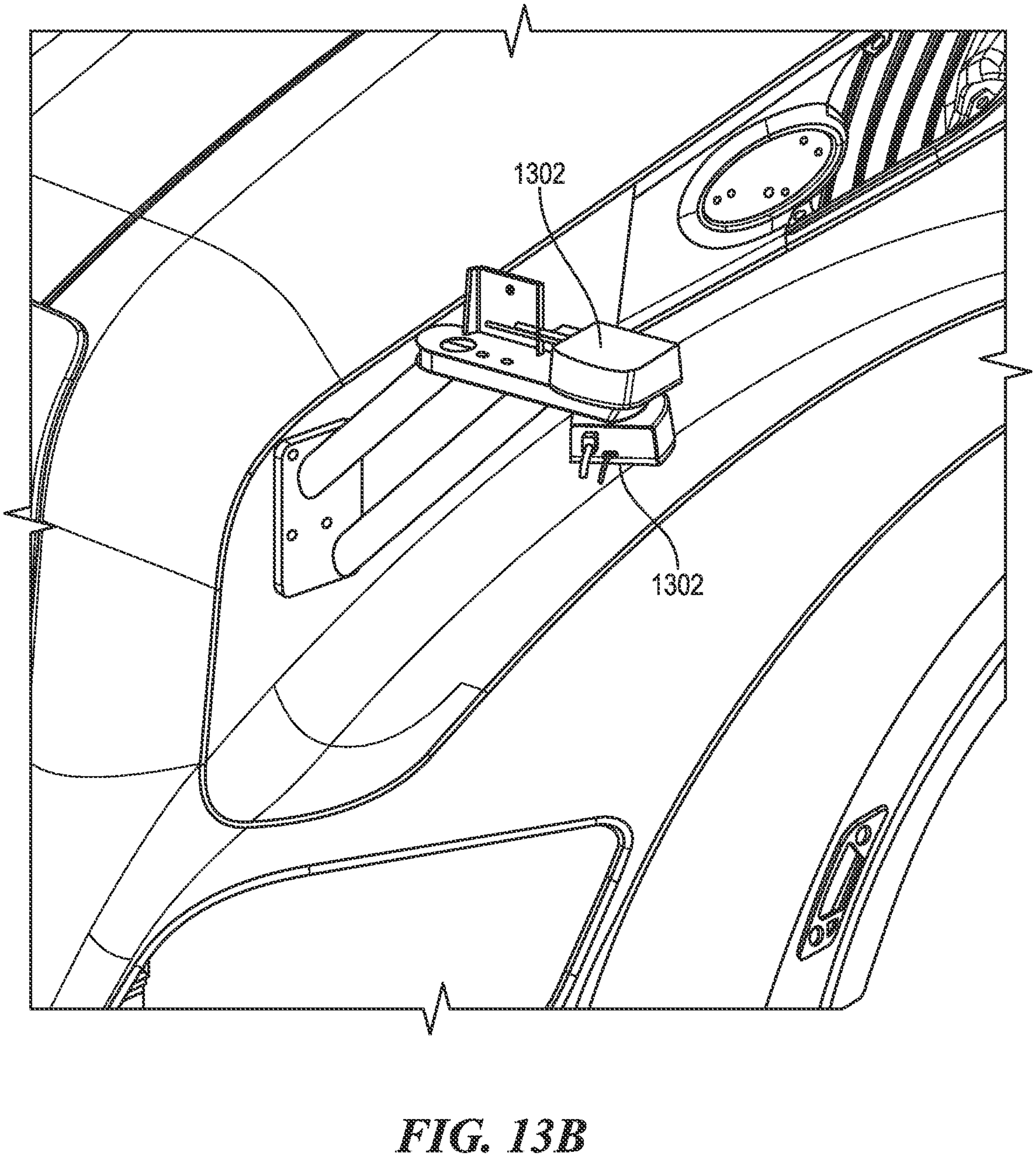

FIGS. 13A and 13B provide perspective views of LiDAR devices 1302 installed on a vehicle in accordance with example layouts described herein. For example, four of the LiDAR devices 1302 are located at a front end of the vehicle, with two of the four being front-oriented and two of the four being side-oriented. Meanwhile, two of the LiDAR devices 1302 are located outside of the vehicle cabin and are rear-oriented. As illustrated, the LiDAR devices 1302 are attached to an exterior surface of the vehicle. For example, the four of the LiDAR devices 1302 that are located at the front end of the vehicle are attached to an exterior surface of the vehicle via side hood assemblies (e.g., side hood assemblies 310 illustrated in FIG. 3).

Figure 14A:
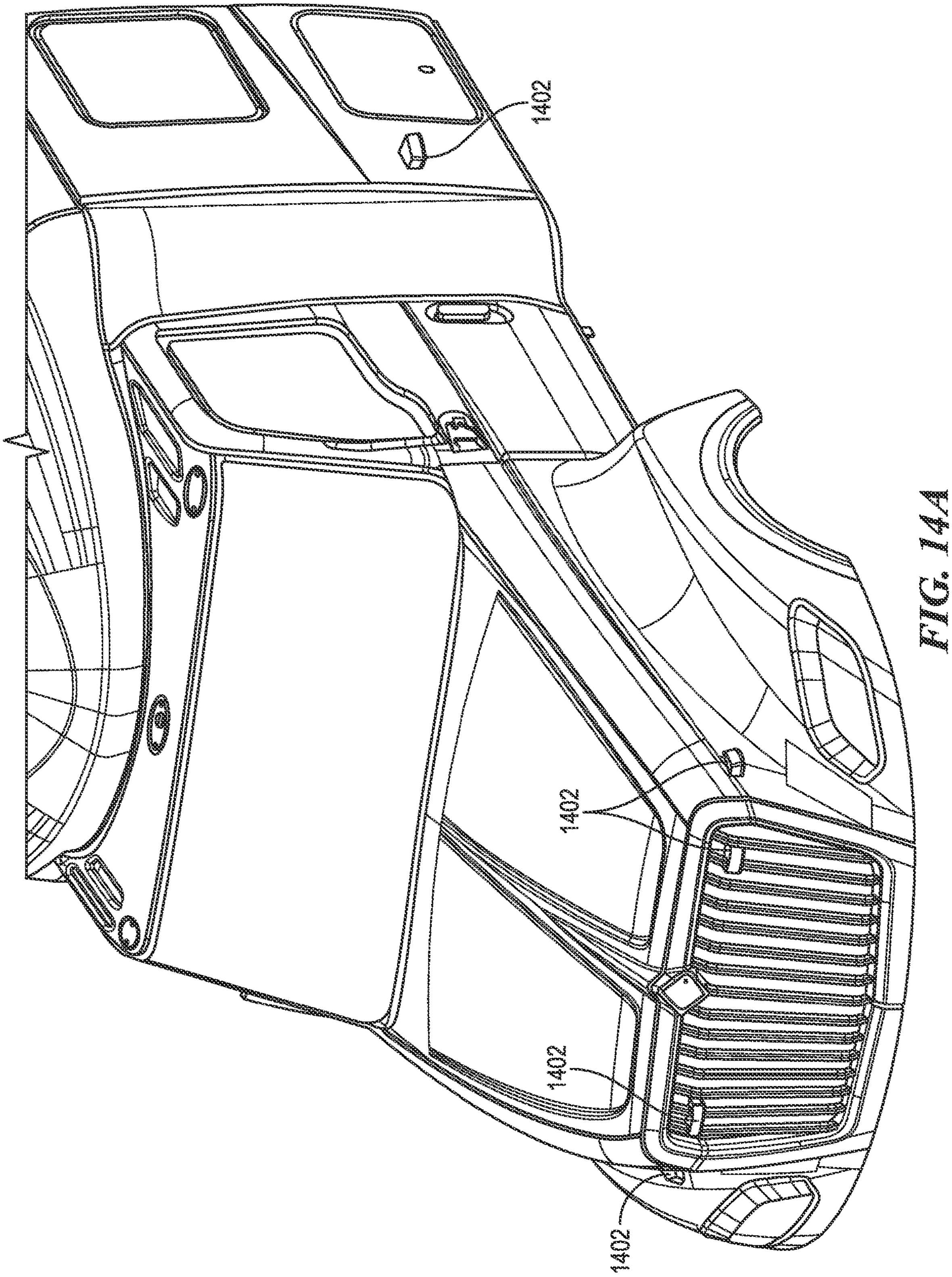
FIGS. 14A and 14B show perspective views of LiDAR devices of an example sensor system that are attached to a vehicle.
Figure 14B:
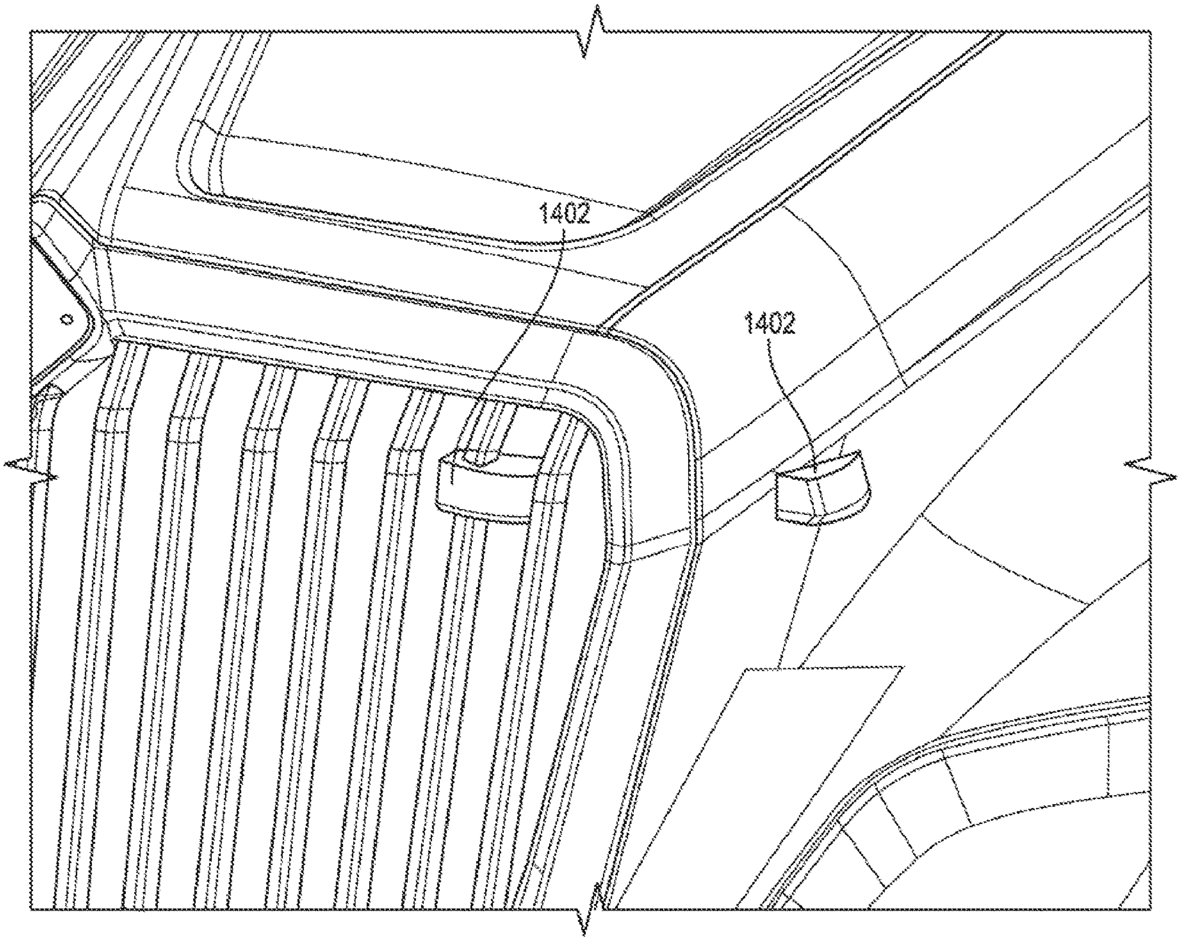

FIGS. 14A and 14B provide perspective views of LiDAR devices 1402 installed on a vehicle in accordance with other example layouts described herein. For example, six LiDAR devices 1402 are attached to an exterior surface of the vehicle (e.g., via assemblies or assemblies), with two being front-oriented, two being side-oriented, and two being rear-oriented.

Figure 15A:
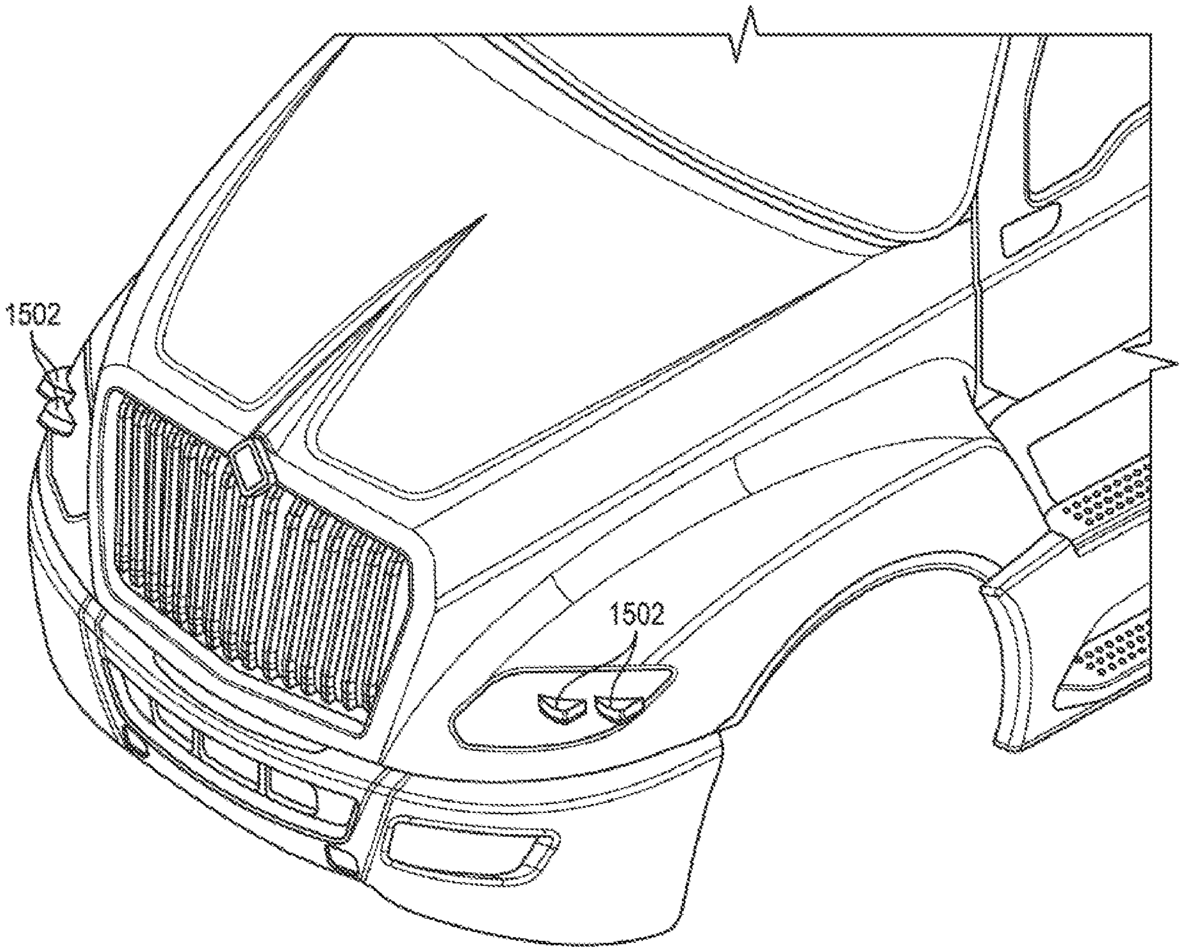
FIGS. 15A, 15B, and 15C show perspective views of LiDAR devices of an example sensor system that are attached to a vehicle.
Figure 15B:
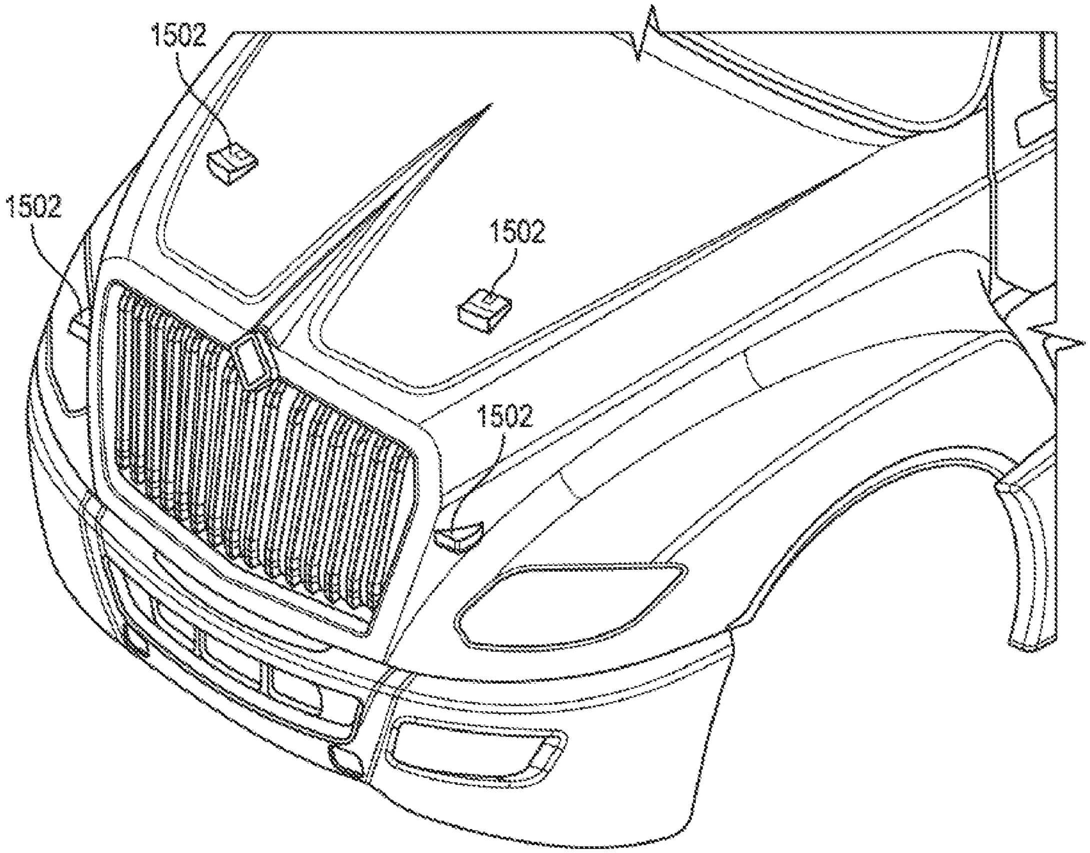
Figure 15C:
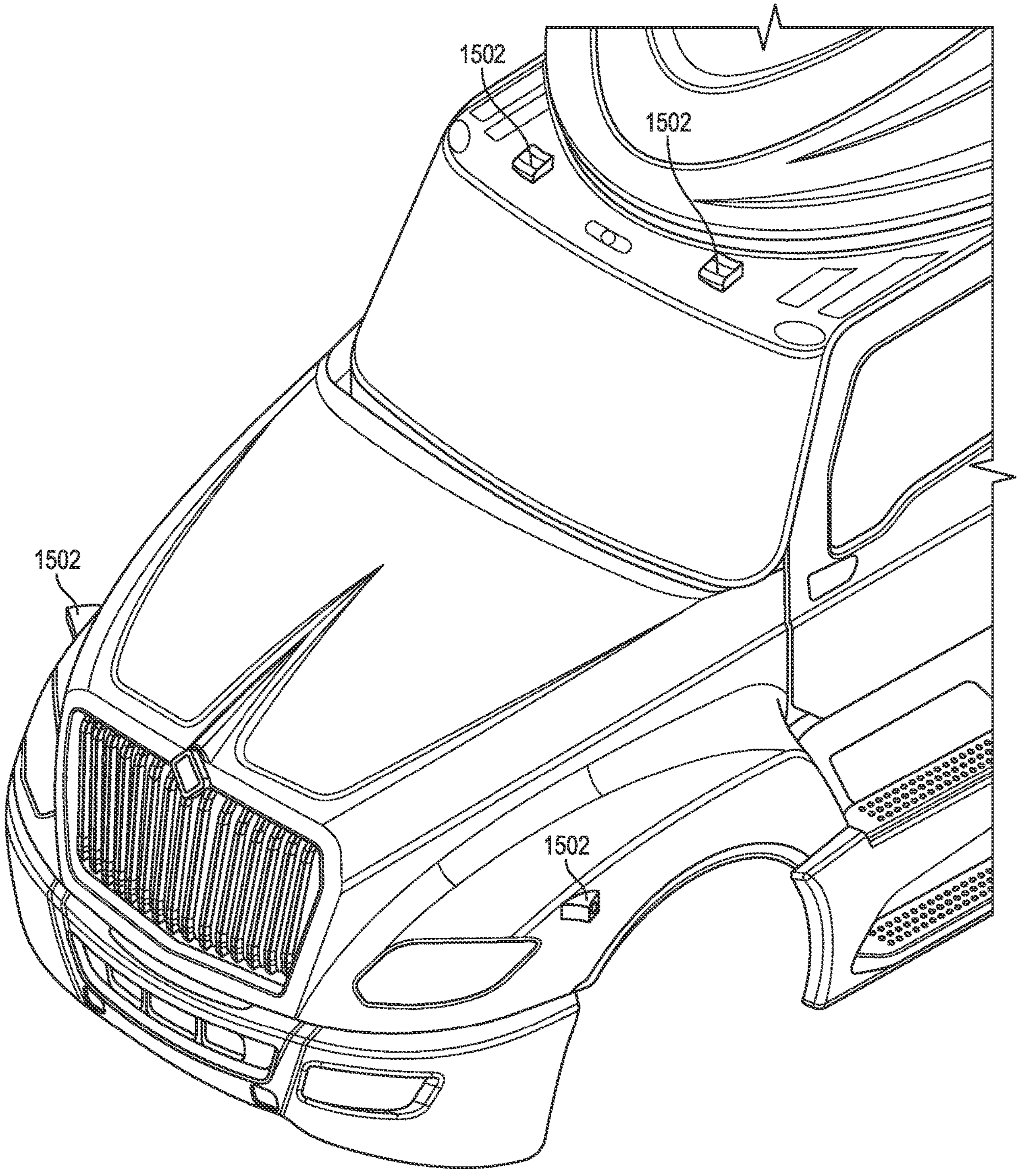

FIGS. 15A, 15B, and 15C provide perspective views of LiDAR devices 1502 installed on a vehicle in accordance with other example layouts described herein. Each of FIGS. 15A, 15B, and 15C illustrate four LiDAR devices 1502 that are front-oriented or side-oriented. In each of FIGS. 15A, 15B, and 15C, at least two LiDAR devices 1502 that are side-oriented are located at or near the front end of the vehicle.

Figure 16:
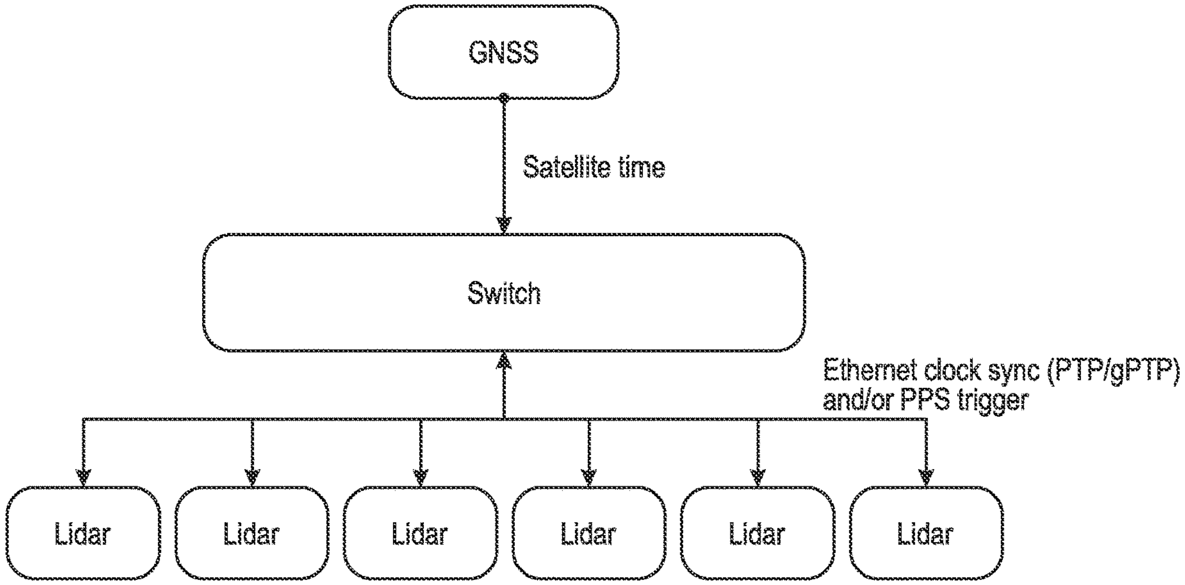
FIG. 16 shows a diagram for synchronization of LiDAR devices of an example sensor system for use with an autonomous vehicle.

FIG. 16 provides a diagram illustrating aspects of data collection of LiDAR devices of a sensor system for use with a vehicle. In some embodiments, each LiDAR device maintains an internal clock, and the internal clocks of the LiDAR devices are synchronized to one time source. For example, as illustrated in FIG. 16, the internal clocks of the LiDAR devices are synchronized to a switch clock time and/or a GNSS satellite time. In some embodiments, via the synchronized internal clocks, the LiDAR devices are configured for scan synchronization, or initiating measurement cycles simultaneously.

VI. Exemplary Sensing Device Layouts

Figure 17:
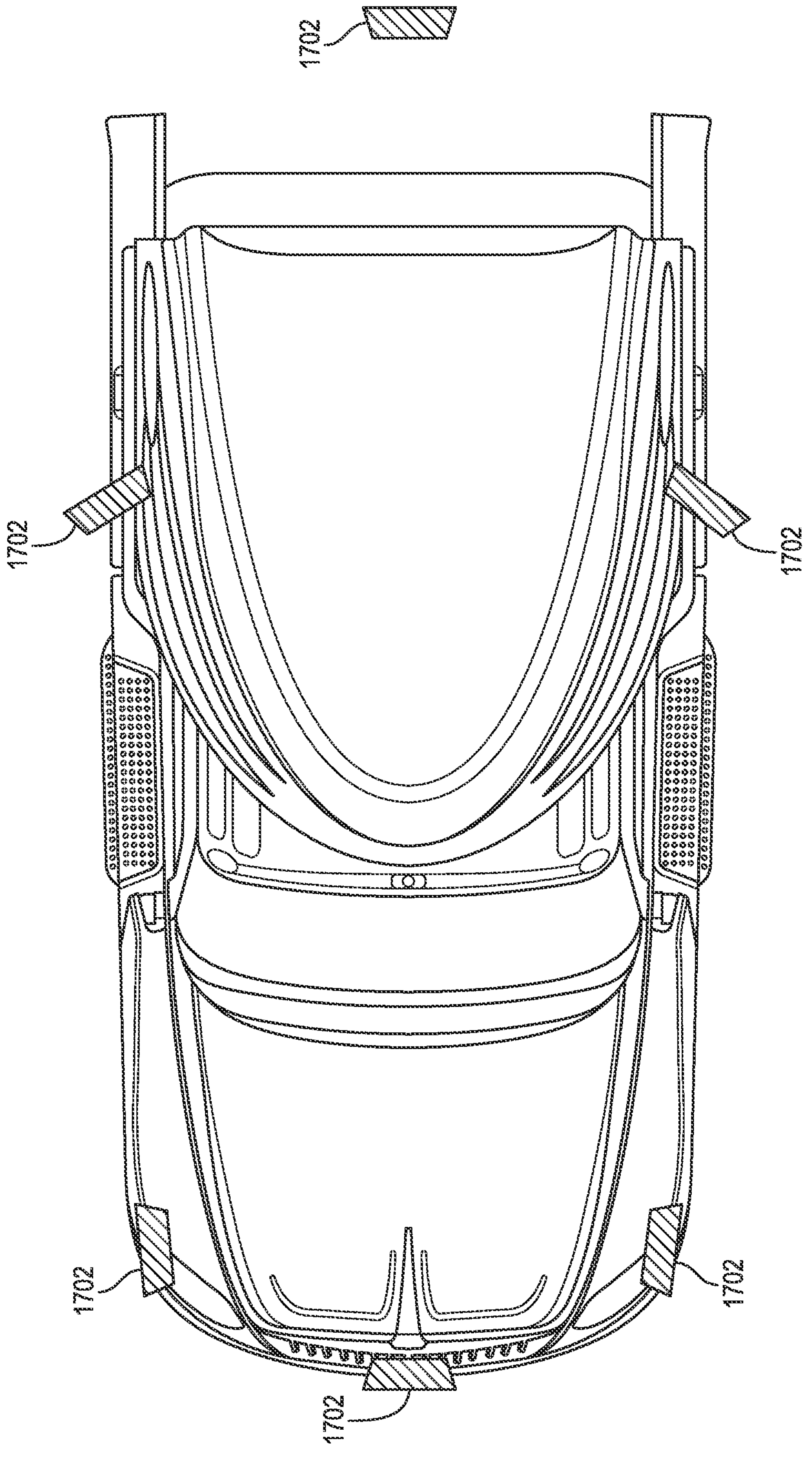
FIG. 17 shows a diagram of an example layout of radar devices of an example sensor system along a vehicle.

FIG. 17 illustrates an example configuration and layout of radar units 1702 of a sensor system for use with a vehicle. In some embodiments, the radar units 1702 are used to support object detection provided by cameras and LiDAR devices. As such, in some embodiments, the radar units 1702 of the sensor system are associated with a non-essential level of autonomous operation of the vehicle. In some examples, the radar units 1702 are transitioned to operational states in response to certain conditions (e.g., the vehicle performing lane changing operations, the vehicle being located at an intersection). In some embodiments, the radar units 1702 are configured to measure ranges to objects, azimuth and/or elevation angles, reflectivity of objects, and velocity of objects.

In the illustrated example of FIG. 17, the sensor system include six radar units 1702. In some embodiments, the radar units 1702 are associated with a range of up to 200 meters, up to 300 meters, up to 350 meters, up to 400 meters, or up to 500 meters. In some embodiments, the radar units have fields-of-view of 100 degrees to 150 degrees, 110 degrees to 130 degrees, or 115 degrees to 125 degrees horizontally for a range within 80 meters, 100 meters, or 110 meters. In some embodiments, the radar units 1702 have fields-of-view of 20 degrees to 60 degrees, 30 degrees to 50 degrees, or 35 degrees to 45 degrees horizontally for a range within 275 meters, 300 meters, or 350 meters.

As illustrated in FIG. 17, the radar units 1702 are oriented in different directions. In some embodiments, a radar unit 1702 is oriented in a front direction and is used to support general front object detection. In some embodiments, two radar units 1702 are oriented in lateral side directions and support intersection object detection (e.g., with side-oriented LiDAR devices and cameras). In some embodiments, two radar units 1702 are oriented in a rear direction of the vehicle and support lane changing object detection. In some embodiments, a radar unit 1702 is located at the rear end of the vehicle (e.g., under a trailer, at a rear of a trailer, above a trailer) and is used to detect objects located directly behind the vehicle. In some embodiments, the radar unit 1702 is located underneath a trailer of the vehicle to detect objects located behind the trailer. In some examples, the range of the radar units 1702 located underneath the trailer may be attenuated.

Figure 18:
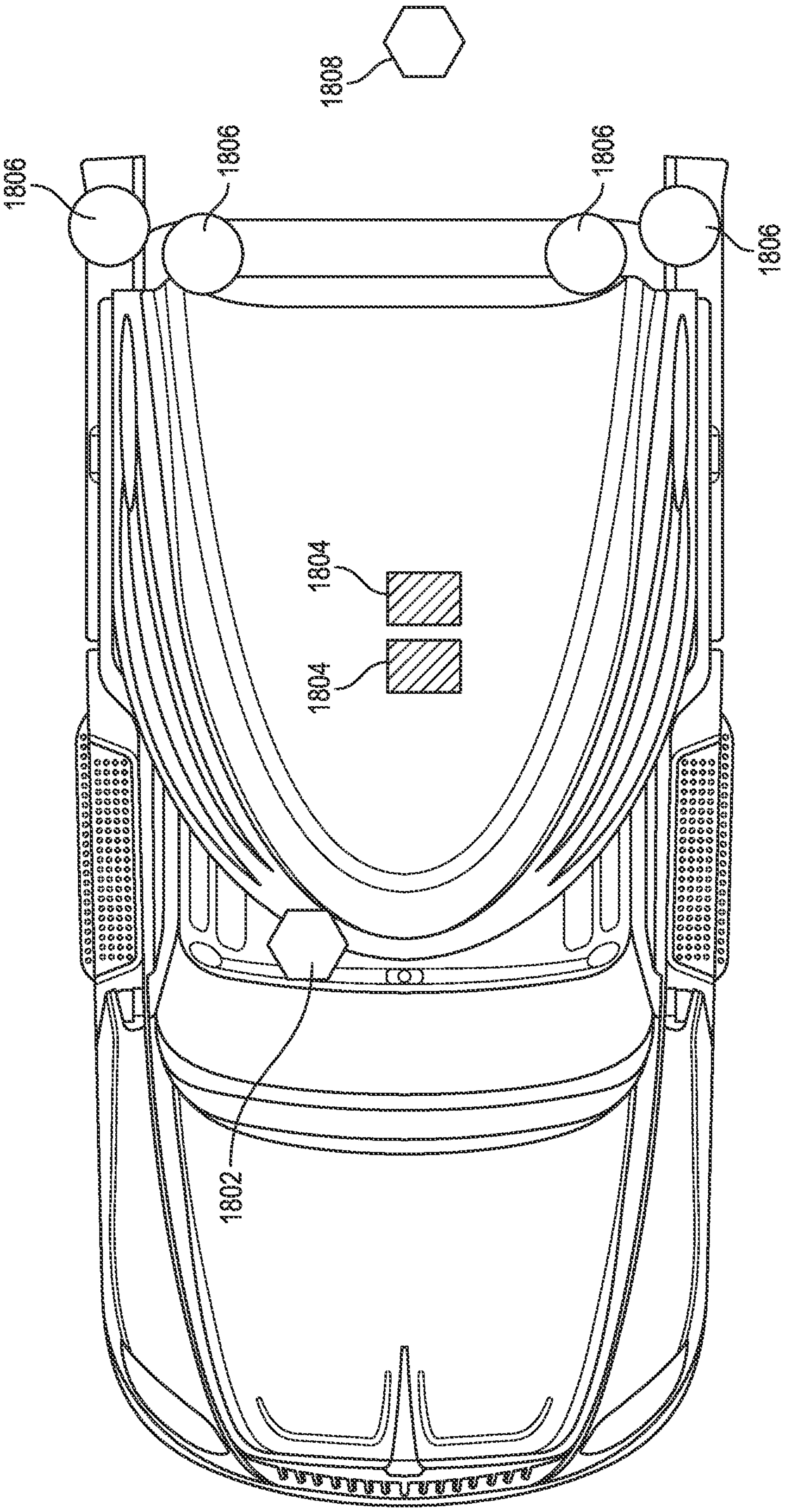
FIG. 18 shows a diagram of an example layout of GNSS devices and inertial measurement units (IMUs) of an example sensor system along a vehicle.

FIG. 18 illustrates example configurations and layouts of GNSS devices and/or IMUs of a sensor system for use with a vehicle. In some embodiments, the sensor system includes GNSS/IMU integrated units. In some embodiments, the sensor system includes one or more standalone GNSS devices and one or more standalone IMUs.

In some embodiments, the sensor system includes a standalone roof IMU 1802 configured for pose estimation for other sensing devices of the sensor system. For example, the standalone roof IMU 1802 provides pose estimation for cameras and LiDAR devices. In particular, pose estimation includes determining sensor positions and attitude angles based on fusing IMU data with sensor data in real time. With pose estimation enabled by at least the standalone roof IMU 1802, sensor data collected by different sensing devices are fused together with improved accuracy, with relative motion between different sensing devices and the vehicle being eliminated.

In some embodiments, the sensor system includes two GNSS devices 1804 located on a roof of the vehicle. In some embodiments, the two GNSS devices 1804 are redundant with each other. As such, one of the two GNSS devices 1804 is associated with an essential level of autonomous operation, and the other of the two GNSS devices 1804 is associated with a non-essential level of autonomous operation. In some embodiments, the two GNSS devices 1804 are integrated with one or more IMUs. In some embodiments, the GNSS devices 1804 are configured for real-time kinematic positioning (RTK) and precise point positioning (PPP) correction. In some embodiments, the two GNSS devices 1804 are GNSS receivers or transceivers.

With the two rooftop GNSS devices 1804, a satellite signal is obtained for use as a system clock source. In some embodiments, sensing devices, controllers, computing devices, and/or the like of the sensor system are synchronized based on a satellite signal, in some embodiments. The rooftop GNSS devices are further configured for vehicle localization and cabin attitude/altitude estimation. In some embodiments, the sensor system includes four antennas 1806 for the two rooftop GNSS devices 1804, as illustrated in FIG. 18. In some embodiments, the sensor system includes one antenna 1806 (e.g., shared by the two rooftop GNSS devices 1804), two antennas 1806, or three antennas 1806. In some embodiments, the rooftop GNSS devices include a dual antenna interface for the four antennas 1806 to provide vehicle heading estimations. In some embodiments, a rooftop GNSS device 1804 is coupled with one or more antennas 1806. In some embodiments the rooftop GNSS devices 1804 are installed at an upper portion of a vehicle interior (e.g., a roof of a vehicle cabin), and the antennas 1806 are installed on an exterior surface of the vehicle, such as the roof.

As illustrated in FIG. 18, the sensor system includes a standalone chassis IMU 1808. In some embodiments, the standalone chassis IMU 1808 is configured to provide chassis control feedback. Thus, with data collected by the standalone chassis IMU, the in-vehicle control computer 150 receives feedback from the vehicle performing various driving-related operations and controls the vehicle control subsystems 146 accordingly. In some embodiments, the standalone roof IMU 1802 and the standalone chassis IMU 1808 are included in a group of sensing devices associated with a non-essential level of autonomous operation.

VI. Exemplary Sensor System Operations

Figure 19:
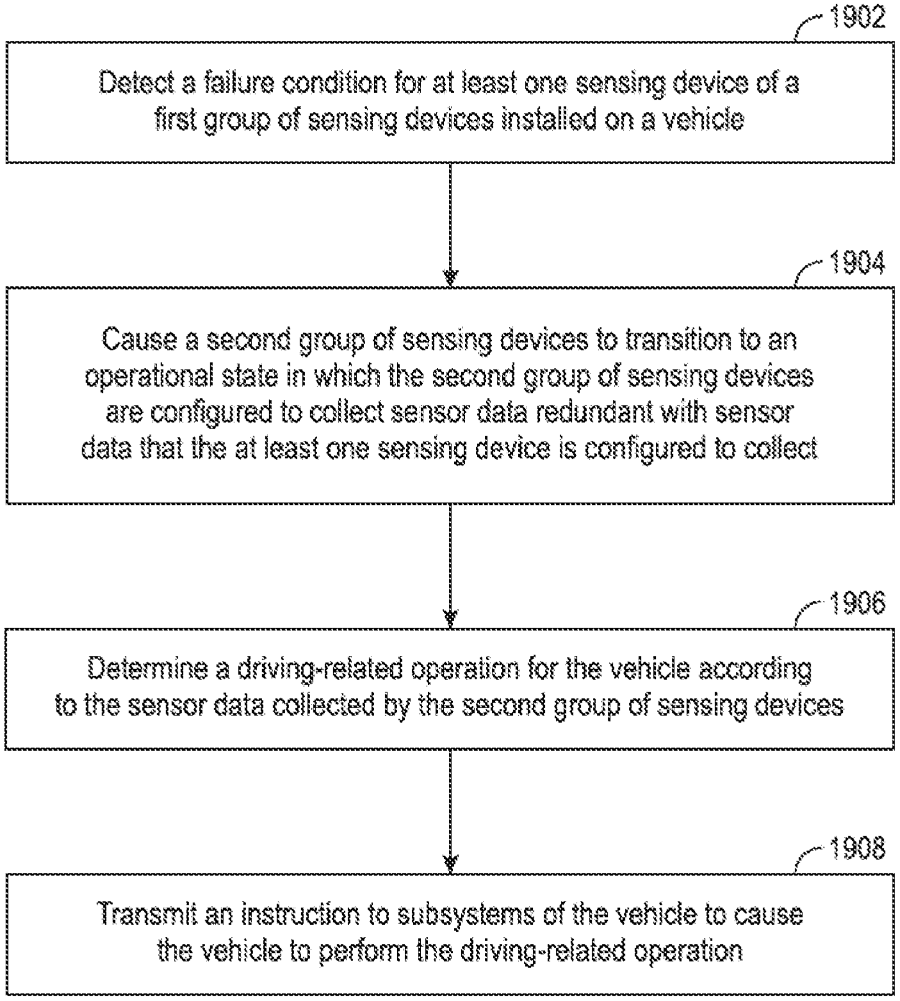
FIG. 19 shows a flowchart of example operations for autonomous operation of a vehicle with an example sensor system.

FIG. 19 illustrates a flowchart of an example method for autonomous operation of the vehicle. In particular, the method is performed with a sensor system for use with the vehicle in accordance with embodiments described herein. In some embodiments, the method is performed or implemented by an in-vehicle control computer 150.

At an operation 1902, a failure condition for at least one sensing device of a first group of sensing devices is detected. For example, the first group of sensing devices are sensing devices associated with an essential level of autonomous operation of the vehicle. In some examples, sensing devices that are associated with the essential level of autonomous operation (or sensing devices that are identified as essential) are configured and intended to continuously operate while the vehicle is in a state of autonomous operation. In some embodiments, the failure condition is detected based on a failure to receive data from the at least one sensing device. In some embodiments, the failure conditions is detected based on a data checking operation (e.g., a checksum) performed on data received from the at least one sensing device resulting in a failure.

At an operation 1904, a second group of sensing devices are caused to transition to an operational state. In the operational state, the second group of sensing devices are configured to collect sensor data that is redundant with sensor data that the at least one sensing device having a failure condition is configured to collect.

In some embodiments, the second group of sensing devices are associated with a non-essential level of autonomous operation. For example, the second group of sensing devices are configured to be redundant with the first group of sensing devices. As such, the second group of sensing devices are configured to be in a non-operational state, and at operation 1904, the second group of sensing devices transition to an operational state to support the failed sensing device of the first group.

As another example, the second group of sensing devices are caused to transition to an operational state at operation 1904 in response to certain conditions being satisfied. For example, the second group of sensing devices are identified as non-essential and performance-enhancing, and the transition to operational state is caused in response to a determination that a current performance of the first group of sensing devices needs to be enhanced. Thus, in some examples, the second group of sensing devices are caused to transition to an operation state to operate at the same time with the at least one sensing device of the first group, without a failure condition being detected. For example, the second group of sensing devices include radar units that are caused to transition to an operational state in response to a determination that velocity information for objects detected by the at least one sensing device of the first group is needed.

In some embodiments, the second group of sensing devices is located in an assembly with the at least one sensing device. In some embodiments, the second group of sensing devices includes LiDAR devices that are configured for a range that is less than or equal to the range of LiDAR devices of the first group of sensing devices.

In some embodiments, the first group of sensing devices is coupled or connected to a controller unit that is different than a controller unit to which the second group of sensing devices is coupled or connected. Accordingly, in some embodiments, the fault condition is detected via a first controller unit, and the second group of sensing devices are caused to transition to the operational state via a second controller unit.

At an operation 1906, a driving-related operation for the vehicle is determined. In particular, the driving-related operation is determined according to the sensor data collected by the second group of sensing devices. For example, the driving-related operation is determined based on an object detected via the sensor data, based on a roadway or lane marking detected via the sensor data, a trailer angle determined using the sensor data, chassis telemetry included in the sensor data, and/or the like.

At an operation 1908, an instruction is transmitted to subsystems of the vehicle to cause the vehicle to perform the driving-related operation. For example, the instruction is transmitted to the vehicle drive subsystem 142, the vehicle control subsystem 146, and/or the vehicle power subsystem 148 to cause the subsystem to operate. As discussed herein, operation of various subsystems of the vehicle causes the vehicle to perform the driving-related operation.

In some embodiments, the method further includes providing timing information to the second group of sensing devices. The second group of sensing devices are configured to collect the sensor data according to the timing information. In some embodiments, the timing information is also provided to the first group of sensing devices, and the first group and the second group are configured to collect sensor data in a synchronized manner.

In this document the term "exemplary" is used to mean "an example of" and, unless otherwise stated, does not imply an ideal or a preferred embodiment. In this document, the term "microcontroller" can include a processor and its associated memory.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described, and other implementations, enhancements and variations can be made based on what is described and illustrated in this disclosure.

What is claimed is:

1. A system for use on an autonomous vehicle, the system comprising:

a plurality of assemblies each modularly attached to the autonomous vehicle and each comprising two or more sensing devices, wherein a total number of sensing devices of the plurality of assemblies is divided into a first group of sensing devices that are associated with an essential level of autonomous operation of the autonomous vehicle and a second group of sensing devices that are associated with a non-essential level of autonomous operation of the autonomous vehicle; and wherein the non-essential level of autonomous operation is a redundant or performance-enhancing level of autonomous operation above the essential level of autonomous operation;

wherein the second group of sensing devices of the total number of sensing devices included by the plurality of assemblies are defaulted to a non-operational state, and are configured to transition to an operational state from a non-operational state of power conservation in response to a failure condition that triggers the non-essential level of autonomous operation of the autonomous vehicle;

wherein the second group of sensing devices are configured to collect, in the operational state, sensor data that is redundant with sensor data collected by the first group of sensing devices, or sensor data that enhances and supplements sensor data collected by the first group of sensing devices.

2. The system of claim 1, wherein the plurality of assemblies includes two assemblies that are located at a respective front corner of the autonomous vehicle, and wherein the two assemblies each include at least one LiDAR device of the first group of sensing devices that is oriented towards a respective lateral orientation of the autonomous vehicle.

3. The system of claim 1, wherein each LiDAR device of the first group and the second group is associated with a field-of-view, and wherein horizontal aspects of respective fields-of-view of the LiDAR devices of the first group and the second group overlap by at least a predetermined amount.

4. The system of claim 1, wherein the first group of sensing devices includes LiDAR devices that are each oriented towards a front orientation of the autonomous vehicle, and wherein the second group of sensing devices includes LiDAR devices that are each oriented towards a lateral orientation of the autonomous vehicle.

5. The system of claim 1, wherein the first group of sensing devices includes red-green-blue (RGB) cameras; wherein the second group of sensing devices includes infrared (IR) cameras, wide-angle cameras, and radar devices; and wherein each of the RGB cameras of the first group are associated with one of a long range, a medium range, or a short range, and wherein respective fields-of-view of the RGB cameras of the first group overlap in a horizontal plane by at least a predetermined amount.

6. The system of claim 1, wherein the plurality of assemblies are arranged at locations that are symmetrical across a longitudinal axis of the autonomous vehicle.

7. The system of claim 1, wherein each assembly inside of which the sensing devices are located includes a sensor heating device;

wherein the heating device is automatically operated in response to an environmental or ambient temperature being less than a threshold temperature, or the heating device is automatically operated in response to a decline in image quality or data quality being determined.

8. The system of claim 1, wherein side-oriented medium-range LiDAR devices are identified as non-essential for a general autonomous operation of the vehicle and are transitioned to an operational state in response to a determination that the vehicle is located at an intersection.

9. The system of claim 1, wherein essential LiDAR devices include LiDAR devices configured for long-range and medium-range sensing, and non-essential LiDAR devices include LiDAR devices configured for short-range sensing.

10. The system of claim 1, wherein:

the sensing devices are associated with priority levels corresponding to different levels of autonomous operation;

the sensor data collected by the sensing devices are processed and communicated in an order according to the priority levels;

wherein the sensor data collected by essential sensing devices has a higher priority over the sensor data collected by non-essential sensing devices.

11. The system of claim 1, wherein the second group of sensing devices are caused to transition to an operational state from a non-operational state in response to a determination that the autonomous vehicle is located in a low visibility environment.

12. An autonomous vehicle comprising:

a plurality of assemblies that are removably attached to the autonomous vehicle; and a plurality of LiDAR devices that are each located inside of an assembly of the plurality of assemblies, wherein each LiDAR device is oriented to collect sensor data for a respective portion of an environment surrounding the autonomous vehicle, wherein a first subset of the plurality of LiDAR devices are associated with an essential level of autonomous operation of the autonomous vehicle and a second subset of the plurality of LiDAR devices are associated with a non-essential level of autonomous operation of the autonomous vehicle, and wherein LiDAR devices of the second subset are turned off into a non-operational state in a duration in which the autonomous vehicle is operated at the essential level of autonomous operation, and wherein the LiDAR devices of the second subset are configured to transition to an operational state from the non-operational state in response to a failure condition that triggers the non-essential level of the autonomous operation;

wherein the LiDAR devices of the second subset are defaulted to a non-operational state and are configured to collect, in the operational state, sensor data that is redundant with sensor data collected the LiDAR devices of the first subset, or sensor data that enhances and supplements sensor data collected by the LiDAR devices of the first subset;

wherein the non-essential level of autonomous operation is a redundant or performance-enhancing level of autonomous operation above the essential level of autonomous operation.

13. The autonomous vehicle of claim 12, wherein at least one LiDAR device of the first subset is located inside a same assembly as at least one LiDAR device of the second subset.

14. The autonomous vehicle of claim 12, wherein the first subset of LiDAR devices are coupled to a first controller, and wherein the second subset of LiDAR devices are coupled to a second controller that is different than the first controller.

15. The autonomous vehicle of claim 12, wherein two of the plurality of assemblies are located at respective front corners of the autonomous vehicle such that respective LiDAR devices located inside the two assemblies are oriented in lateral directions of the autonomous vehicle.

16. A method for autonomous operation of a vehicle, the method comprising:

detecting a failure condition for at least one sensing device of a first group of sensing devices installed on the vehicle;

in response to the failure condition, causing a second group of sensing devices to transition, from a non-operational state of power conservation, to an operational state in which the second group of sensing devices are configured to collect sensor data that is redundant with sensor data collected by the first group of sensing devices, or to collect sensor data that enhances and supplements sensor data collected by the first group of sensing devices;

determining, by a vehicle controller, a driving-related operation for the vehicle according to the sensor data that is collected by the second group of sensing devices; and transmitting, by the vehicle controller, an instruction related to the driving-related operation for the vehicle to one or more subsystems of the vehicle to cause the vehicle to perform the driving-related operation;

wherein:

the first group of sensing devices are associated with an essential level of autonomous operation of the autonomous vehicle;

the second group of sensing devices are associated with a non-essential level of autonomous operation of the autonomous vehicle and are defaulted to a non-operational state;

the non-essential level of autonomous operation is a redundant or performance-enhancing level of autonomous operation above the essential level of autonomous operation.

17. The method of claim 16, wherein each of the second group of sensing devices is located in an assembly that is modularly attached to the vehicle that also includes a sensing device of the first group.

18. The method of claim 16, further comprising:

providing timing information to the second group of sensing devices, wherein the second group of sensing devices are configured to collect the sensor data according to the timing information.

19. The method of claim 16, wherein the first group of sensing devices includes optical cameras and the second group of sensing devices includes infra-red cameras, and wherein the failure condition includes sensing data collected by the first group of sensing devices being characterized by a visibility less than a predetermined threshold.

20. The method of claim 16, further comprising:

obtaining assembly information that identifies a respective assembly inside which each of the second group of sensing devices is located; and performing a sensor fusion operation with sensor data collected by at least two of the second group of sensing devices that are located in a same assembly, wherein the driving-related operation is determined based on an object detected via the sensor fusion operation.

* * * * *